US011481083B2

United States Patent
Andersson et al.

(10) Patent No.: US 11,481,083 B2
(45) Date of Patent: Oct. 25, 2022

(54) TOOL FOR ARRANGING OBJECTS AND ADJUSTING SPACING IN A LAYOUT

(71) Applicant: Figma, Inc., San Francisco, CA (US)

(72) Inventors: Rasmus Mathias Andersson, San Francisco, CA (US); Ryan Jonathan Kaplan, San Francisco, CA (US); Shuaihang Wang, San Mateo, CA (US); Joshua Shi, San Francisco, CA (US); Badrul Farooqi, San Francisco, CA (US); Dave Pagurek van Mossel, Vancouver (CA)

(73) Assignee: Figma, Inc., San Francisco, CA (US)

( * ) Notice: Subject to any disclaimer, the term of this patent is extended or adjusted under 35 U.S.C. 154(b) by 5 days.

(21) Appl. No.: 16/574,061

(22) Filed: Sep. 17, 2019

(65) Prior Publication Data

US 2020/0089387 A1    Mar. 19, 2020

Related U.S. Application Data

(60) Provisional application No. 62/733,010, filed on Sep. 18, 2018.

(51) Int. Cl.
*G06F 3/04845* (2022.01)
*G06F 3/04817* (2022.01)
(Continued)

(52) U.S. Cl.
CPC ........ *G06F 3/04812* (2013.01); *G06F 3/0482* (2013.01); *G06F 3/04817* (2013.01);
(Continued)

(58) Field of Classification Search
CPC ............. G06F 3/04812; G06F 3/04817; G06F 3/0482; G06F 3/04842; G06F 3/04845; G06F 3/04847
See application file for complete search history.

(56) References Cited

U.S. PATENT DOCUMENTS 8,091,036 B1    1/2012  Pavek et al.
2002/0032554 A1  3/2002  Nakagawa
(Continued)

FOREIGN PATENT DOCUMENTS

WO    WO 2017/128043    8/2017

OTHER PUBLICATIONS

Chao, E. (Jan. 31, 2017). Exploring repeat grid in Adobe XD. Adobe Blog. Retrieved Aug. 18, 2021 from https://blog.adobe.com/en/publish/2016/11/17/exploring-repeat-grid-in-adobe-xd.html (Year: 2017).*

(Continued)

*Primary Examiner* — Linda Huynh
(74) *Attorney, Agent, or Firm* — Hickman Becker Bingham Ledesma LLP

(57) ABSTRACT

Computer-implemented design tool functions are described herein for recognizing organized collections of objects in a design layout, and providing controls to manipulate, in a selected organized collection, individual objects and arrangements of multiple objects. In an embodiment, a computing device determines whether an arrangement of selected objects in a design layout satisfies certain criteria, and if so, the computing device recognizes the arrangement as an organized collection, and provides controls within a selected organized collection to perform various operations to manipulate an individual object within the selected organized collection while automatically and dynamically modifying the organized collection to maintain desired uniformity in the collection.

20 Claims, 14 Drawing Sheets

(51) Int. Cl.
*G06F 3/0482* (2013.01)
*G06F 3/04812* (2022.01)
*G06F 3/04847* (2022.01)
*G06F 3/04842* (2022.01)

(52) U.S. Cl.
CPC ...... *G06F 3/04842* (2013.01); *G06F 3/04845* (2013.01); *G06F 3/04847* (2013.01)

(56) References Cited

U.S. PATENT DOCUMENTS

| | | | | |
|---|---|---|---|---|
| 2005/0094205 A1* | 5/2005 | Lo | ......................... | G06F 40/106 358/1.18 |
| 2005/0094206 A1* | 5/2005 | Tonisson | ............... | G06F 40/186 358/1.18 |
| 2005/0094207 A1* | 5/2005 | Lo | ......................... | G06F 40/174 358/1.18 |
| 2005/0172224 A1* | 8/2005 | Kobashi | ............... | G06F 40/106 715/244 |
| 2006/0198555 A1* | 9/2006 | Hosotsubo | .............. | G06T 11/60 382/162 |
| 2006/0279566 A1* | 12/2006 | Atkins | .................... | G06T 11/60 345/418 |
| 2007/0162844 A1* | 7/2007 | Woodall | ................ | G06F 40/177 715/209 |
| 2007/0266307 A1* | 11/2007 | Panditharadhya | .... | G06T 11/206 715/243 |
| 2008/0256439 A1 | 10/2008 | Boreham et al. | | |
| 2008/0282188 A1* | 11/2008 | Hays | ......................... | G06F 8/24 715/788 |
| 2012/0066588 A1* | 3/2012 | Tokunaga | ............. | G06F 40/103 715/244 |
| 2012/0124492 A1* | 5/2012 | Taron | ..................... | G06F 9/451 715/762 |
| 2013/0055055 A1* | 2/2013 | Turcotte | ................ | G06F 40/106 715/201 |
| 2013/0125033 A1* | 5/2013 | Kelley | .................... | G06F 3/048 715/765 |
| 2016/0092084 A1 | 3/2016 | Dyar | | |
| 2016/0092091 A1* | 3/2016 | Hanson | ............... | G06F 3/04886 715/763 |
| 2016/0267056 A1 | 9/2016 | Hertzog | | |
| 2016/0342315 A1* | 11/2016 | Jaramillo, III | ........ | G06F 3/0481 |
| 2018/0004401 A1* | 1/2018 | Travis | ................ | G06F 3/04883 |
| 2019/0114817 A1* | 4/2019 | Kerr | ...................... | G06F 40/174 |
| 2019/0354247 A1* | 11/2019 | Edmunds | ............. | G06F 3/0483 |

OTHER PUBLICATIONS www.helpx,adobe.com, "Learn how to create repeating elements in Adobe XD using Repeat Grid", https://helpx.adobe.com/xd/help/create-repeating-elements.html, last viewed on Jun. 3, 2019, 6 pages.
www.farmer.com, "A Lightning Fast Interactive Design Tool", https://www.framer.com/docs/tools/#layout, last viewed on Jun. 3, 2019, 15 pages.
International Searching Authority, "Search Report" in application No. PCT/US19/51787, dated Dec. 4, 2019, 17 pages.
Current Claims in application No. PCT/US 19/51787, dated Dec. 2019, 6 pages.
Cho, Elaine, "Exploring Repeat Grid in Adobe XB", Adobe Blog, https://theblog.adobe.com/exploring-repeat-grid-in-adobe-xd, last viewed on Jun. 3, 2019, 10 pages.
European Patent Office, "Search Report"in Application No. 19862635.0, dated May 18, 2022, 10 pages.

* cited by examiner

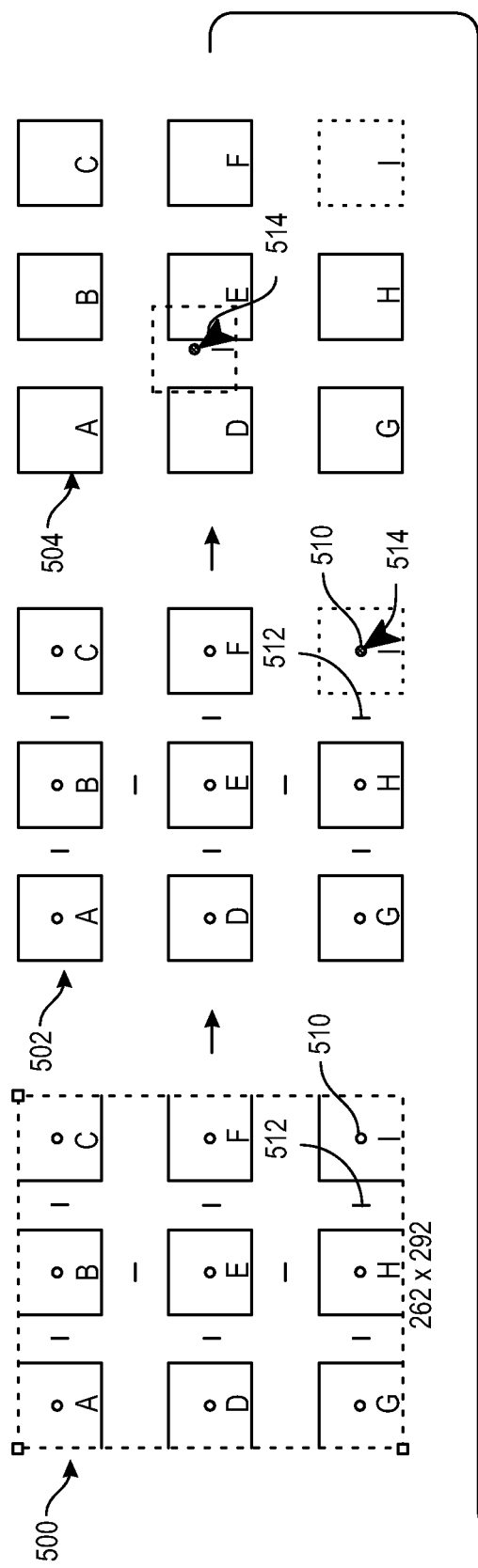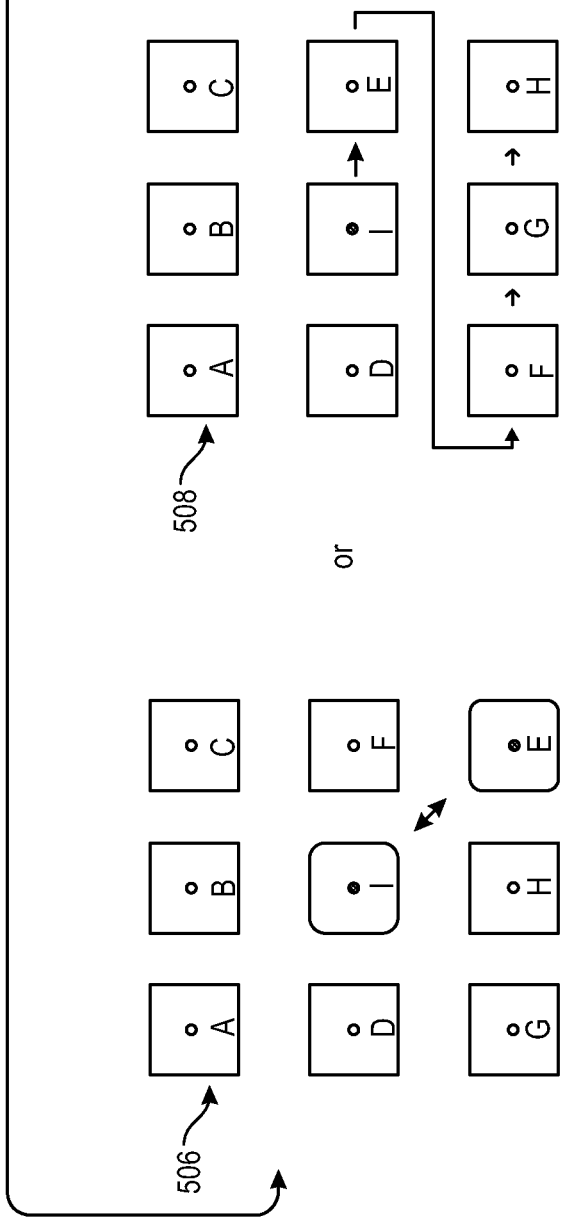
FIG. 5

ND ADJUSTING SPACING IN A LAYOUT

BENEFIT CLAIM

This application claims the benefit under 35 U.S.C. § 119(e) of provisional application 62/733,010 filed Sep. 18, 2018, the entire content of which is hereby incorporated by reference for all purposes as if fully set forth herein.

FIELD OF THE INVENTION

The present disclosure relates to a design tool, and more particularly to a computer-implemented design tool that facilitates arranging objects and adjusting spacing in layouts.

BACKGROUND

A designer uses computer-implemented design tools to create a design, layout, or interface for a wide variety of applications, such as for a graphical user interface, an email application layout, a social media timeline, an advertising graphic, a technical drawing, a flowchart, a set of slides, an image gallery, and/or some other table or grid view or other collection of data or other content. Computer-implemented design tools help to facilitate various aspects of the creation process, however, some aspects remain quite tedious. For instance, designers spend considerable time and effort placing and rearranging objects in a design layout and/or adjusting spacing between objects, which often requires separate and repetitive inputs to move and adjust each of potentially many objects in the layout. Generally, objects in a design layout may include different design elements, such as text boxes, containers for media elements or other content, user-input controls, and other design elements, each of which may practically have any desired shape.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present disclosure are illustrated by way of example, and not in way by limitation, in the figures of the accompanying drawings and in which like reference numerals refer to similar elements.

FIG. 5 illustrates an arrangement of objects and operations performed to rearrange objects within the arrangement according to an embodiment.

DESCRIPTION OF THE EXAMPLE EMBODIMENT(S)

Figure 1:
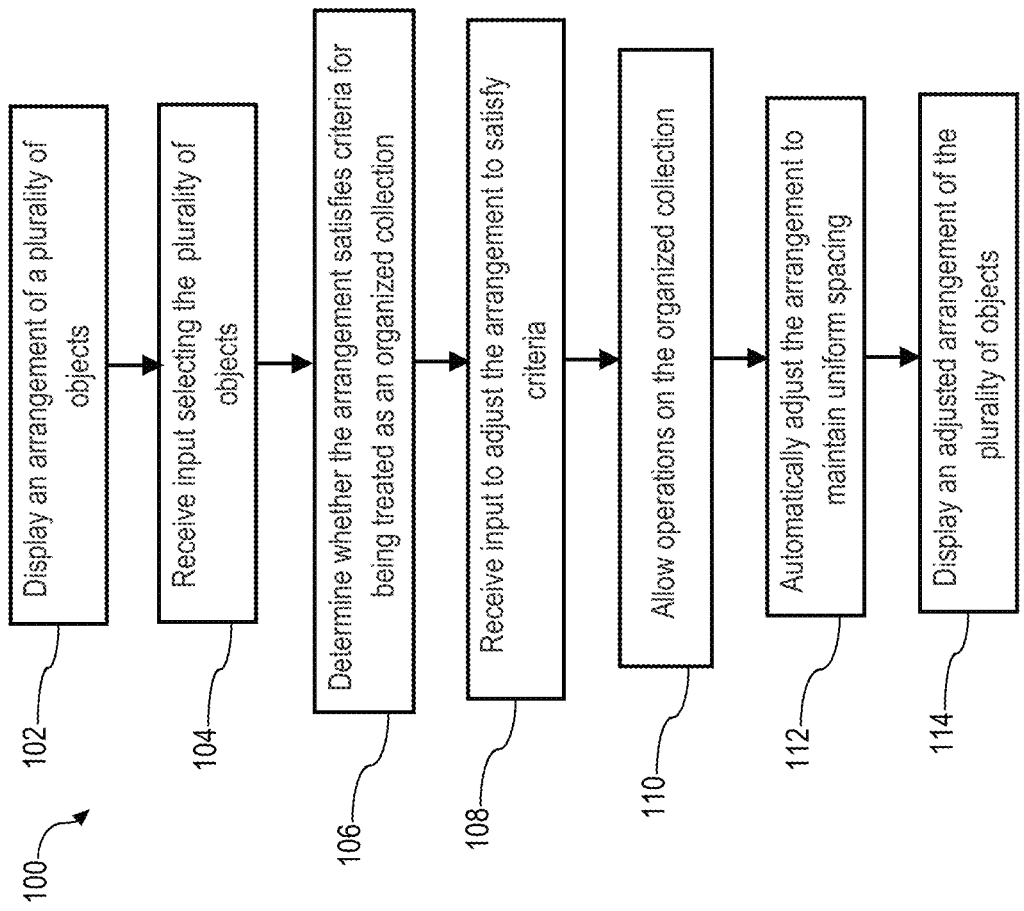
FIG. 1 is a flowchart for providing computer-implemented design tool functions according to an embodiment.

In the following description, for the purposes of explanation, numerous specific details are set forth in order to provide a thorough understanding of the example embodiment(s) of the present disclosure. It will be apparent, however, that the example embodiment(s) may be practiced without these specific details. In other instances, well-known structures and devices are shown in block diagram form in order to avoid unnecessarily obscuring the example embodiment(s).

General Overview

Computer-implemented design tool functions are described herein for recognizing organized collections of objects in a design layout, and providing controls to manipulate, in a selected organized collection, individual objects and arrangements of multiple objects. In an embodiment, a computing device controls a display device to display objects in a design layout. The computing device determines whether an arrangement of selected objects in the design layout satisfies certain criteria, and if so, the computing device recognizes the arrangement as an organized collection. The criteria define characteristics of a list of objects, and the computing device uses the criteria to determine whether each selected object in an arrangement can be organized as part of a list. In this embodiment, the criteria include, with respect to an axis, overlap between objects in a respective list and uniform spacing between objects in the respective list. Illustratively, an axis can be a horizontal axis or a vertical axis orthogonal to the horizontal axis, e.g., an x-axis and a y-axis, respectively. Although, the concepts disclosed herein are not necessarily limited to such axes. Further, in some circumstances, such as in 2-D design layouts, a single object may also satisfy the criteria to be considered a list.

The computing device provides controls within a selected organized collection to perform various operations to manipulate an individual object within the selected organized collection while automatically and dynamically modifying the organized collection to maintain desired uniformity in the collection. For instance, the controls are configured to receive inputs for adjusting the size of an object, adding or deleting an object, and/or moving an object or otherwise adjusting spacing between objects. The controls may also receive inputs for similarly manipulating multiple objects together within a selected organized collections. When executing an operation would result in a rearrangement of the selected objects to no longer satisfy the criteria for being treated as an organized collection, the computing device automatically further rearranges the selected objects to satisfy the criteria. The computing device controls the display device to display this automatic rearrangement of the selected objects. In this manner, an operation to manipulate one or more objects within an organized collection may automatically cause the entire arrangement of all objects in the organized collection to be rearranged to maintain certain uniform characteristics, e.g., uniform spacing between objects. This feature provides an improvement in the technical field of computer-implemented design tools by adding functionality that helps to reduce the need for many repetitive, tedious user-inputs.

The design tool features described herein also include the computing device providing a control to automatically rearrange an arrangement of objects that does not presently satisfy certain criteria to be treated as an organized collection. For instance, the computing device may receive input that selects the arrangement of objects and determine that the arrangement does not satisfy the certain criteria. In response to this determination, the computing device provides a control and receives via the control a command to rearrange, without further user-input, the selected arrangement of objects in order to satisfy the criteria to be treated as an organized collection. The computing device then controls the display device to display the rearrangement of the selected objects, and allows further operations to be performed within the organized collection.

Computer-Implemented Design Tool Functions

FIG. 1 is a flowchart for providing computer-implemented design tool functions according to an embodiment. The flowchart 100 of FIG. 1 may be implemented by a computing device, such as a computing device 1300 of FIG. 13. The computing device includes a software system, such as the software system 1400 of FIG. 14. The computing device utilizes the software system to execute instructions to provide a computer-implemented design tool that is displayed on a display device and receives input from one or more input devices to control functionality of the design tool. The computing device may provide the design tool as an application executing on the computing device, and/or may execute instructions that are received from another computing device, such as an application server connected to the computing device through a wired or wireless network. In this context, a computing device as referred to herein may actually include one or more computing devices, e.g., a single computing device or multiple computing devices in a cloud-based system.

At block 102, a computing device provides or receives one or more computer-readable instructions, which when executed, cause a display device to display an arrangement of a plurality of objects in a graphical user interface (GUI) of the design tool. The objects may be ornamental or functional elements or otherwise serve as containers or placeholders for elements, such as text boxes, media elements or other content, and user-input controls, and may practically have any desired shape.

At block 104, the computing device receives input that selects the plurality of objects. In practice, the displayed GUI of the design tool may include many objects, and the selected plurality of objects at block 104 may include all of the objects displayed in the GUI or a subset thereof. Further, the computing device may receive the input in any suitable manner, such as by input that defines a box around multiple objects, by input that individually selects each object, or by input the selects a frame around multiple objects. Defining a box around multiple objects may be performed by a mouse click action at a first cursor location, moving the cursor to a second location to draw a box around the multiple objects, and releasing the mouse click action to define the box. Similarly, selecting a frame around multiple objects selects the multiple objects, but in an embodiment, the frame is an already defined box or container that is a part of the design layout.

According to an embodiment, at block 104, the computing device processes received input to identify objects, or nodes that represent an object, that should be included in a selection. For instance, when a received input corresponds to a box around a portion of a layout or to a selection of a frame, the computing device is configured to examine the box or frame and to identify objects that are included within the box or frame. In an example, identifying selected objects at block 104 includes identifying or recording parameters of a minimum bounding box around each object (such as coordinates of each corner of a bounding box or rectangle that fully encloses an object, group of objects, and/or list) and a location of a node that corresponds to a center of each object (for instance defined with respect to the bounding box).

At block 106, the computing device determines whether an arrangement of the selected plurality of objects satisfies criteria for being treated as an organized collection. Within an organized collection, each object of the selected plurality of objects is included in a list, and the criteria define characteristics of a list. According to an embodiment, the criteria include: within each list, overlap along an axis by each object in a respective list; and uniform spacing, along the axis, between adjacent objects in the respective list. In one example, objects overlap if a straight line intersects a bounding box around each object, and spacing between adjacent objects is measured between nearest sides of bounding boxes of the adjacent objects. The criteria may also be modified to include requirements that objects within a list are center-aligned, left/right justified for vertical lists arranged along a y-axis, or top/bottom justified for horizontal lists arranged along an x-axis.

At block 106, the computing device iterates through each selected object and attempts to place each object into a list that satisfies the criteria for being treated as an organized collecting. The computing device is configured to define a list direction as being in the axis where the greatest number of objects satisfy the criteria. If an object can be organized into a list, the computing device iterates to a next object to determine whether that object can be organized into a list. In this manner, the computing device attempts to place each object into a single list of one or more lists, or in other words, each object is placed into a list and also into no more than one list. The computing device may reiterate over the selected objects multiple times to determine whether the entire arrangement of selected objects can be treated as an organized collection, such that each selected object.

An organized collection may include multiple lists in a two-dimensional (2-D) layout. In an embodiment, the criteria define characteristics of a 2-D layout of lists as including uniform spacing, along another axis, between adjacent lists in the 2-D layout. For instance, each individual list may be aligned vertically or parallel with a y-axis, such that within each list: each object overlaps along the y-axis, and there is uniform spacing along the y-axis between adjacent objects in each list. In this example organized collection, the multiple lists are further arranged horizontally along an x-axis, such that there is uniform spacing along the x-axis between adjacent lists. The criteria that defines a 2-D organized collection may also include overlap along the other axis between each list of the multiple lists. Similar to the example described above, overlap of lists and spacing between lists may be determined with respect to a bounding box around each list. In an embodiment, criteria that defines a 2-D organized collection does not include uniform spacing between objects across different lists, although, this could be an optional criteria that defines a 2-D organized collection.

Further, an organized collection that includes multiple lists in a 2-D layout may at times be organized into different arrangements of lists. For instance, six objects arranged in a grid of two columns and three rows, may be organized into three horizontal lists or two vertical lists. According to an embodiment, the computing device organizes the objects into the fewest number of lists, so in this example, the 2×3 arrangement of objects is organized into two vertical lists. There may also be a default parameter that causes the computing device to first organize objects into lists along a given axis, for instance, a horizontal x-axis as a default list axis. According to such a default parameter, nine objects arranged in a grid of three columns and three rows may be organized into three horizontal lists rather than three vertical lists.

At block 106, the computing device determines whether selected objects satisfy criteria for being treated as one or more lists and identifies or records bounding box parameters around each list (such as coordinates of each bounding box corner) and a location of a node that corresponds to a center of each list (for instance defined with respect to the bounding box).

At block 108, in response to determining that the arrangement of selected objects does not satisfy the criteria for being treated as an organized collection, the computing device is configured to automatically rearrange the arrangement of selected objects to satisfy the criteria. In an embodiment, at block 108, the computing device provides a control to rearrange the selected objects, and receives via the control an input to adjust automatically, without further user-input, the arrangement of selected objects in order to satisfy the criteria to be treated as an organized collection. In response to receiving the input at block 108, the computing device adjusts the arrangement to satisfy the criteria, for instance, by moving one or more objects and/or lists to overlap along an axis, and/or by moving one or more objects and/or lists so that there is uniform spacing along an axis between adjacent lists and/or objects in a list. The computing device may adjust the arrangement according to predetermined parameters or according to variable parameters.

In an embodiment, the computing device is configured to make a minimal amount of adjustments to the arrangement to satisfy the criteria. For instance, the computing device may move one or more objects or lists to satisfy the uniform spacing criteria while preserving object/list dimensions, but may not further move the one or more objects or lists to satisfy more strict overlap criteria (such as being center-aligned), that is, if bounding boxes of the one or more objects or lists already overlap along an axis. In an embodiment, however, the computing device may, for a 2-D organized collection, move one or more objects to be center-aligned within each list. At block 108, these and other parameters for adjusting the arrangement may be modified by a user, for example. At block 108, the computing device controls the display device to display the adjusted arrangement that satisfies the criteria to be treated as an organized collection, and removes the control to rearrange the selected objects to create an organized collection.

At block 110, the computing device, in response to determining that the arrangement of the selected objects satisfies the criteria for being treated as an organized collection, allows operations on objects within the concurrently selected and corresponding organized collection. The computing device allows operations within the organized collection on selected individual objects as well as on selected groups of objects. More particularly, the computing device is configured to receive input that causes the design tool to perform various operations, such as inserting objects into the design layout, deleting objects from the design layout, modifying sizes of objects, changing shapes of objects, adjusting distances between objects, selecting objects, and the like.

The computing device may provide controls for receiving input to perform operations within the organized collection. The controls may include a combination of controls that are displayed with the layout in the GUI of the design tool, and controls that are not displayed but controlled by keyboard actions or other input interactions (e.g., mouse cursor clicks and movements). In an embodiment, the computing device at block 108 provides unique controls for performing operations within the organized collection that would otherwise not be available if a selected arrangement of objects did not satisfy the criteria for being treated as an organized collection.

At block 110, the computing device may receive an input to perform an operation that if strictly performed would violate one or more of the organized collection criteria, such as an operation to move an object/list, add or delete and object, or adjust a space between objects/lists that would destroy uniform spacing between other objects in a respective list or uniform spacing between other lists. In response to an input to perform such an operation, at block 112, the computing device automatically adjusts the arrangement of objects in the organized collection by performing the operation and automatically creating a new arrangement of the selected objects that satisfies the organized collection criteria. So, for example, the computing device will perform a given operation that adjusts a spacing between two objects in a list and will automatically adjust spacing between other objects in the list to maintain uniform spacing across the entire list. In another example, the computing device will perform a given operation that adjusts a dimension of a bounding box of a list, which thereby changes spacing between the list and an adjacent list, and in response the computing device will automatically adjust spacing between each other list to maintain uniform spacing across a 2-D arrangement of lists.

At block 114, the computing device provides or receives one or more instructions, which when executed, cause the display device to display the new arrangement of selected objects created at block 112.

Example Layouts and Organized Collections

Figure 2:
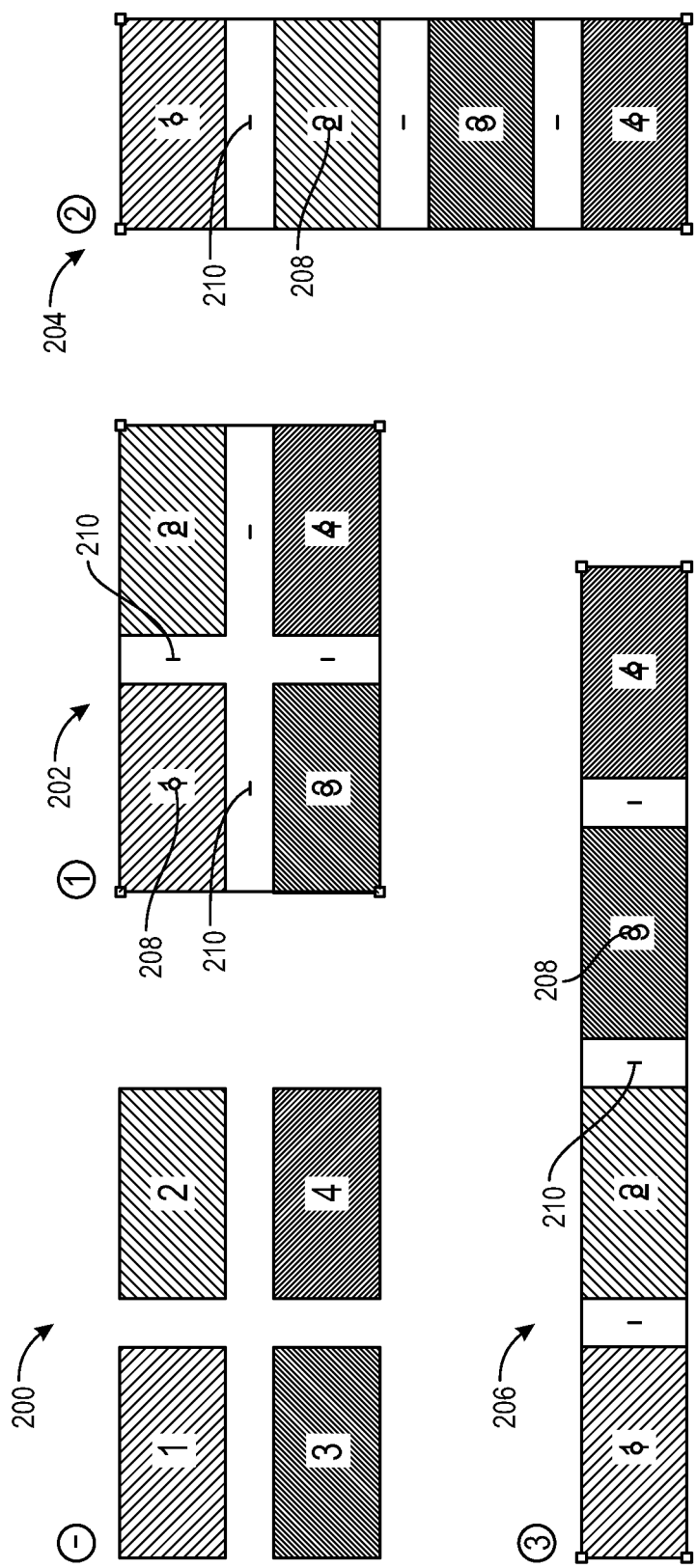
FIG. 2 illustrates arrangements of objects and organized collections.

FIG. 2 illustrates example arrangements of objects and organized collections. In a first arrangement 200, the computing device causes display of objects 1-4 in a 2×2 grid. In arrangement 200, no objects have yet been selected and the organized collection is inactive.

In a second arrangement 202, each object 1-4 has been selected, such as by individually selecting each box via a mouse click or touchpad input, or by selecting a box or frame around the objects. The second arrangement 202 of selected objects 1-4 satisfies criteria to be treated as an organized collection, e.g., as a first horizontal list including objects 1-2, and a second horizontal list including objects 3-4. Alternatively, the organized collection may organize the objects into a first vertical list including objects 1 and 3, and a second vertical list including objects 2 and 4.

In a third arrangement 204, objects 1-4 have been selected and the arrangement satisfies criteria to be treated as an organized collection including a single vertical list. In a fourth arrangement 206, objects 1-4 have been selected and the arrangement satisfies criteria to be treated as an organized collection including a single horizontal list.

When an organized collection is active, such as in arrangements 202, 204, and 206, the computing device provides unique controls for performing operations within the organized collection. In FIG. 2, the unique controls include markers 208 that are shown as circles or dots generally centered within each object, and handles 210 that are shown as short lines generally centered in spaces between adjacent objects/lists. Arrangements 202, 204, and 206 include a marker in each object, and handles between each adjacent object/list, but FIG. 2 only includes reference numerals and lead-lines for a portion of the illustrated markers and handles.

The markers 208 provide a control to mark or provide a second level selection of one or more objects within the organized collection, and perform operations particular to the marked one or more objects. For example, a user may click on the marker for object 1 and 4 to mark the objects within any of the organized collections of arrangements 202, 204, and 206. The GUI of the design tool may indicate the marking of objects by filling-in the circle or providing some other visual indication of the marking. Once selected within the organized collection, the computing device is configured to receive further input to perform operations on the marked objects.

For example, with respect to the marked objects in the organized collection, a user may provide input corresponding to placing a curser over a corner or edge of one of the marked objects, clicking or otherwise selecting the corner or edge, and moving the cursor to change dimensions of all the marked objects. In this example, the dimensions of the marked objects may be changed proportionally with the cursor movement, which may be particularly useful when the marked objects have different shapes or dimensions.

In another example, the user may provide an input of placing a cursor over some other area within a boundary of an individual marked object, clicking or otherwise selecting the object, and moving the cursor to move to a different position the individual marked object as a group with any other marked objects.

Handles 210 provide functionality to use a single control to adjust spacing between all objects or lists within an organized collection. For example, referring to arrangement 204, the computing device may receive input including placing a cursor over handle 210 between objects 1 and 2, clicking or otherwise selecting the handle, moving the cursor up to decrease the space between objects 1 and 2, moving the cursor down to increase the space between objects 1 and 2, and releasing or otherwise deselecting the handle to perform the operation of changing the space between objects 1 and 2.

In response to operations performed on one or more objects marked via markers 208, operations to adjust spacing using handles 210, or other operations, the computing device automatically adjusts the arrangement of the organized collection to maintain uniform spacing between objects in a list and/or lists among a 2-D arrangement of lists. In the above example of selecting and moving the handle 210 between objects 1 and 2 in arrangement 204, the computing device adjusts the spacing between objects 1 and 2 in accordance with handle movement, and also moves objects 3 and 4, and adjusts spacing between each object to correspond to the spacing adjustment between objects 1 and 2. To execute this functionality, the computing device keeps track of data regarding cursor movements, inputs from input devices, locations and dimensions of the objects/lists, and/or spacings between objects/lists. The computing devices uses such data to identify which particular object or control is being modified and to distribute spacing changes evenly over objects/lists in an organized collection, while helping to maintain the original location of the organized collection in a layout.

Spacing Operations on a 2-D Arrangement

Figure 3:
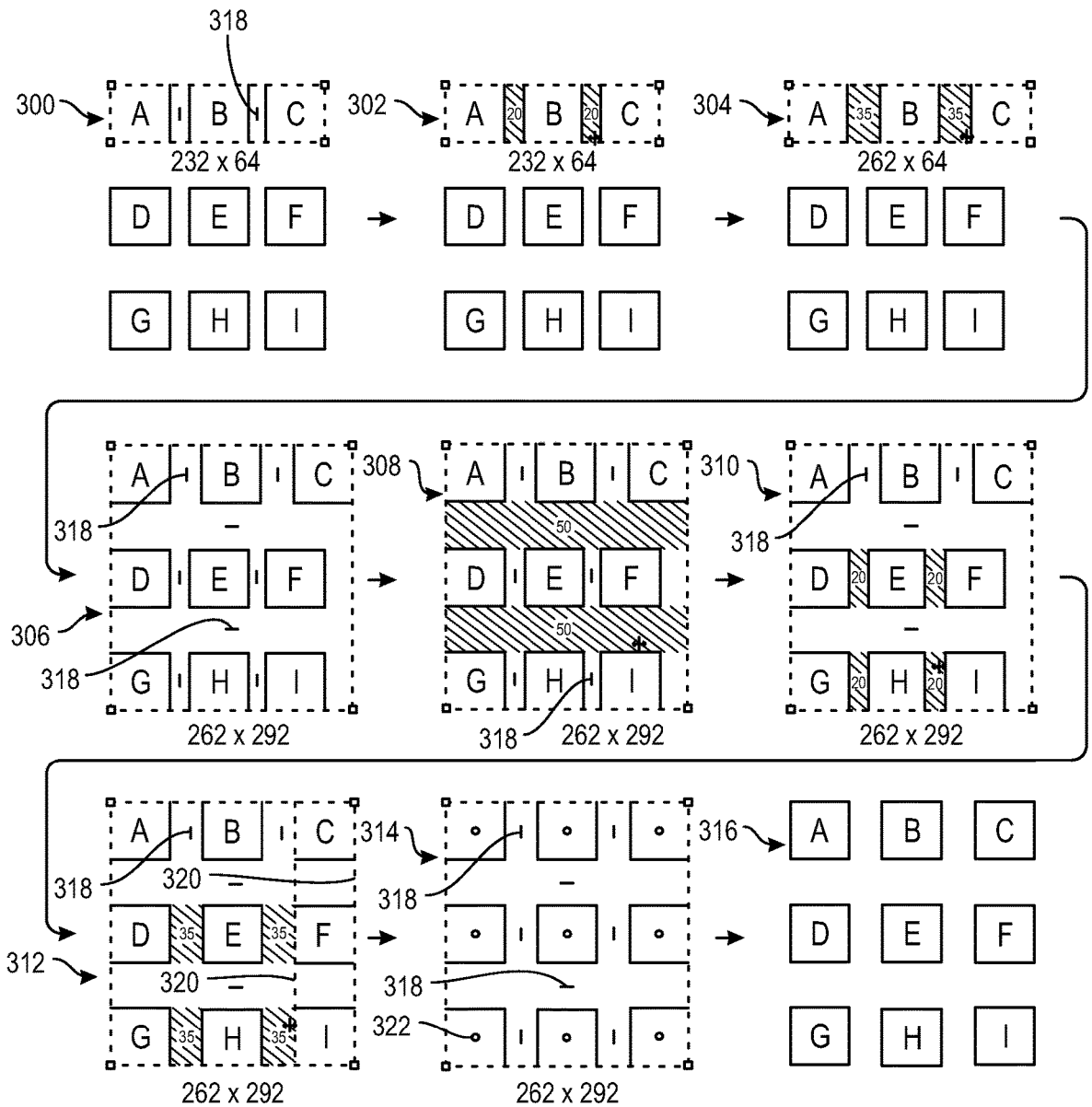
FIG. 3 illustrates an arrangement of objects and operations performed on the arrangement to adjust spacing between objects and lists according to an embodiment.

FIG. 3 illustrates an arrangement of objects and operations performed on the arrangement to adjust spacing between objects and lists according to an embodiment. More particularly, FIG. 3 illustrates an arrangement of objects A-I in a 3×3 grid. In an embodiment, an initial arrangement 300 of the objects A-I may be organized as a first horizontal list including objects A-C, a second horizontal list including objects D-F, and a third horizontal list including objects G-I. Within each list, the objects overlap along the horizontal x-axis, and the spacing between adjacent objects is uniform. Further, there is uniform spacing between adjacent lists of the first, second, and third horizontal lists. Consequently, the computing device may treat a selection of objects A-I as an organized collection, and provide unique controls to perform operations on the organized collection. More particularly, FIG. 3 shows handles 318 (not all of which are enumerated in FIG. 3) similar in form and function to the handles 210 of FIG. 2.

In arrangement 300, the computing device has received a selection of the first list including objects A-C, and treats this selection as an organized collection. The computing device has also placed handles 318 in spaces between objects A-C to control the size of those spaces. In arrangement 300, the spacing between objects in each list is also uniform across different lists, for example, the spacing between objects A and B is equal to the spacing between objects D and E, and objects G and H. The criteria for treating a 2-D arrangement as an organized collection, however, does not necessarily require that the spacing between objects in each list is uniform across different lists, as shown, for instance, in arrangement 304.

In arrangement 302, the computing device has received an input to control the handle 318 between objects B and C, and highlights the space between objects B and C. Because objects A-C have been selected and are treated as an organized collection, the computing device also highlights the space between objects A and B. This indicates to a designer that adjusting the space between objects B and C will simultaneously and correspondingly adjust the space between objects A and B.

In arrangement 304, the computing device has received an input via the handle 318 between objects B and C to increase the size of the space. In response to this input, the computing device increases the size of the space between objects B and C, and also increases the size of the space between objects A and B to match the increase in the size of the space between objects B and C.

In arrangement 306, the computing device has now received a selection of all the objects A-I. The computing device treats the whole arrangement as an organized collection because each of the objects A-I is organized into a list, the lists overlap along the vertical y-axis, and the lists are evenly spaced from each other. In arrangement 306, the computing device has also placed additional handles 318 in spaces between the lists and between objects of the second list (objects D-F) and blocks of the third list (objects G-I).

In arrangement 308, the computing device has received an input to control the handle 318 between the second list (objects D-F) and third list (objects G-I), and highlights the space between the second and third lists. Because the organized collection also includes the first list (objects A-C), the computing device also highlights the space between the first list and the second list. This indicates to a designer that adjusting the space between the second and third lists will simultaneously and correspondingly adjust the space between the first and second lists.

In arrangement 310, the computing device has received an input to control the handle 318 between objects H and I, and highlights the space between objects H and I. Because the organized collection also includes objects D-G, and because the spaces between adjacent objects in the second and third lists are uniform, the computing device also highlights the spaces between objects D-E, objects E-F, and objects G-H. This indicates to a designer that adjusting the space between objects H and I will simultaneously and correspondingly adjust these other highlighted spaces.

In arrangement 312, the computing device has received an input via the handle 318 between objects H and I to increase the size of the space. In response to this input, the computing device increases the size of the space between objects H and I, and also increases the size of the space between objects D-E, objects E-F, and objects G-H to match the increase in size of the space between objects H and I. In arrangement 312, the computing device also provides a visual indication, vertical lines 320, to assist a designer to match the size of the space between objects of the first list.

Arrangement 314 illustrates that markers 322, which are the same in form and function to the markers 208 of FIG. 2, may be provided to mark one or more objects of the organized collection. Arrangement 316 shows a final arrangement of the objects A-I after the computing device responds to just a few inputs by adjusting the spacing between each of the objects and lists to provide a uniform arrangement of the objects.

Spacing Operations on a Single List

Figure 4:
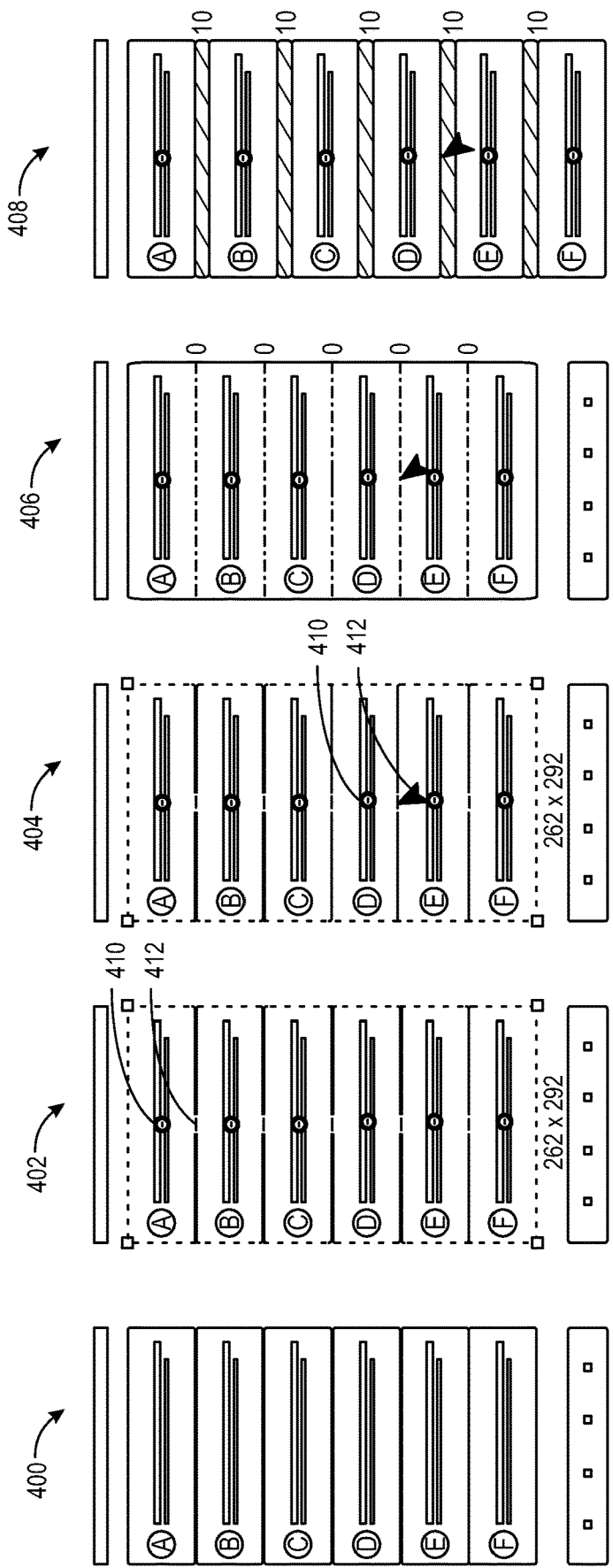
FIG. 4 illustrates an arrangement of objects in a list and operations to adjust spacing between objects according to an embodiment.

FIG. 4 illustrates an arrangement of objects in a list and operations to adjust spacing between objects according to an embodiment. More particularly, FIG. 4 illustrates an arrangement 400 of objects A-F in a vertically aligned list. In arrangement 402, the computing device has received a selection of the objects A-F, and treats this selection as an organized collection because the objects overlap along the x-axis and there is uniform spacing between the objects. In arrangement 402, the computing device has placed markers 410 centered in each object, and handles 412 between each object to control the size of the spacing between objects. The markers and handles in FIG. 4 are similar in form and function to other markers and handles, respectively, discussed herein.

In FIG. 4 there is initially zero spacing between adjacent objects, so the handles 412 are placed at an intersection between the objects. Otherwise, the functionality represented by FIG. 4 is similar to the functionality already described. In arrangement 404, the computing device has received input highlighting a handle between objects D and E to indicate that the handle is interactive. In arrangement 406, the computing device has received input selecting the handle between objects D and E, which in turn causes each of the handles between the other objects to be highlighted as interactive with the selected handle, because the selected objects are being treated as an organized collection. In arrangement 408, the computing device has received further input at the handle 412 between objects D and E. This received input causes an increase in the size of the space between all the objects, such that the spaces between adjacent objects in the list are uniform.

Rearranging Operations on a 2-D Arrangement

FIG. 5 illustrates an arrangement of objects and operations performed to rearrange objects within the arrangement according to an embodiment. More particularly, the computing device provides functionality that allows one or more objects to be moved or rearranged within an organized collection. Generally, an operator may click or otherwise mark an object or multiple objects within an organized collection, which enables further input to move the marked object or objects around to another place in the collection. This movement of one or more objects may result in a rearrangement of the objects in the organized collection to maintain uniform spacing criteria of the organized collection. Operations that are related to this rearrangement include, but are not limited to, a swap operation and a reflow operation. A swap operation causes a marked object to take over the position of another item in the selection, which is assigned an original position of the marked object being moved. A reflow operation causes intermediate objects, which are objects between an original position of the marked object being moved and a new position of the marked object, to be shifted and/or moved to a different position generally downstream of its original position and/or to a next list in a 2-D collection. In an embodiment, a control is provided to select between performing a swap operation and a reflow operation by using an additional input. For example, pressing a keyboard key (e.g., CTRL) while moving a marked object with a mouse cursor 514 may perform a swap operation, and not pressing the keyboard key while moving the marked object with a mouse cursor may perform the reflow operation.

FIG. 5 illustrates an arrangement of objects A-I in a 3×3 grid similar to arrangement 316 of FIG. 3. An initial arrangement 500 of the objects A-I may be organized as a first horizontal list including objects A-C, a second horizontal list including objects D-F, and a third horizontal list including objects G-I. Within each list, the objects overlap along the horizontal x-axis, and the spacing between adjacent objects is uniform. Further, there is uniform spacing between adjacent lists of the first, second, and third horizontal lists. Consequently, in arrangement 500, the computing device treats a selection of objects A-I as an organized collection, and provides controls to perform operations on the organized collection. More particularly, the computing device has provided markers 510 centered in each object, and handles 512 between each object in a given list and between the three lists to control the size of the spacing between the objects and lists. The markers and handles in FIG. 5 are similar in form and function to other markers and handles, respectively, discussed herein.

In arrangement 502, the computing device has received an input via a marker 510 to mark object I within the organized collection. The input may be received by placing a cursor or pointer over the marker 510 of object I and clicking or otherwise selecting the marker. The design tool may highlight the marker 510 and/or the object I to indicate to a designer that the object has been marked and is interactive. In the arrangement 504, the computing device has received further input to move the object I to a new position. In this example, the new position corresponds to the position of the object E. According to an embodiment, the computing device may determine this new position by tracking center points and/or bounding box parameters of the objects, and determining when a bounding box of a marked object to be moved crosses a center point or axis of another object.

Arrangement 506 illustrates a swap operation in response to the operation to move object I to the position of block E. As shown in arrangement 506, the object I takes over the position of object E, and object E is moved to an original position of object I. If the objects have different sizes and/or shapes, the swap operation could also cause positions of one or more of the other object to be adjusted to maintain uniform spacing between objects within a list and to maintain uniform spacing between lists in a 2-D arrangement of multiple lists.

Arrangement 506 illustrates a reflow operation in response to the operation to move object I to the position of object E. As shown in arrangement 508, the object I takes over the position of object E, and object E is moved downstream or to the right within the second list, which now includes objects D, I, and E. To maintain the original symmetrical arrangement of the 3×3 collection, object F moves down to the third list, which now includes objects F-H, and objects G and H are moved downstream or to the right within the third list. In another embodiment, the object F could remain in the second list, which would include objects D, I, E, and F in that order, centered-aligned, and evenly spaced along a horizontal x-axis. In this embodiment, the third list would include just objects G and H. If the objects have different sizes and/or shapes, the reflow operation could also cause positions of one or more of the other object to be adjusted to maintain uniform spacing between objects within a list and to maintain uniform spacing between lists in a 2-D arrangement of multiple lists.

Rearranging Operations on a Single List

Figure 6:
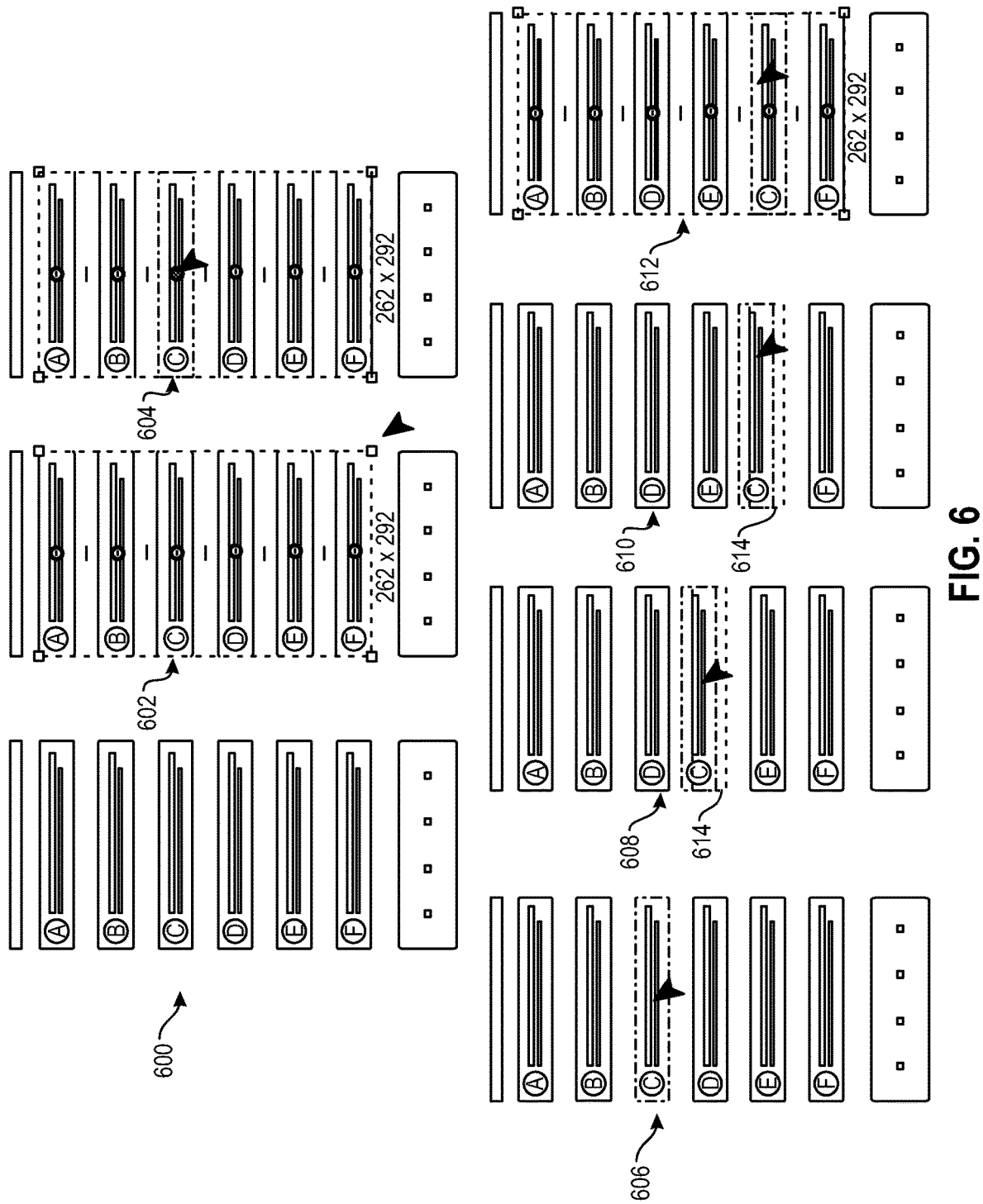
FIG. 6 illustrates an arrangement of objects in a list and operations performed to rearrange objects within the list according to an embodiment.

FIG. 6 illustrates an arrangement of objects in a list and operations performed to rearrange objects within the list according to an embodiment. An initial arrangement 600 includes objects A-F in a vertically aligned list. In arrangement 602, the computing device receives input selecting the objects A-F and the computing device treats the objects as an organized collection, in part by providing markers and handles, as discussed elsewhere herein. In arrangement 604, the computing device receives input that marks object C. And, in arrangements 606 and 608, the computing device receives input the moves object C downward toward objects D and E. More particularly, in arrangement 608, object C is moved down so that its bounding box crosses a horizontal, center-axis of block D, at which point object D moves to the original position of object C. In arrangement 610, object C is further moved down so that its bounding box crosses a horizontal, center-axis of block E, at which point object E moves up to the original position vacated by object D. This provides an example of a reflow operation. In a swap operation, as the object C is further moved down past the object E, the object E may move to the original position of object C and object D may remain at its original position. In arrangement 612, the computing device receives input to place or "drop" the object C at a new position, and the computing device causes display of a final arrangement that maintains uniform spacing between objects and reflows objects D and E up while moving object C to its new position.

The functionality represented by FIG. 6 may also include a feature of providing a ghost outline 614 for a dragged element, such as shown in arrangements 608 and 610. Further, movements of one or more objects may be constrained to a layout or list axis, and pointer or cursor movements on a cross-axis may be ignored. In the example of FIG. 6, only movements along a vertical y-axis are considered in moving the objects.

Figure 7:
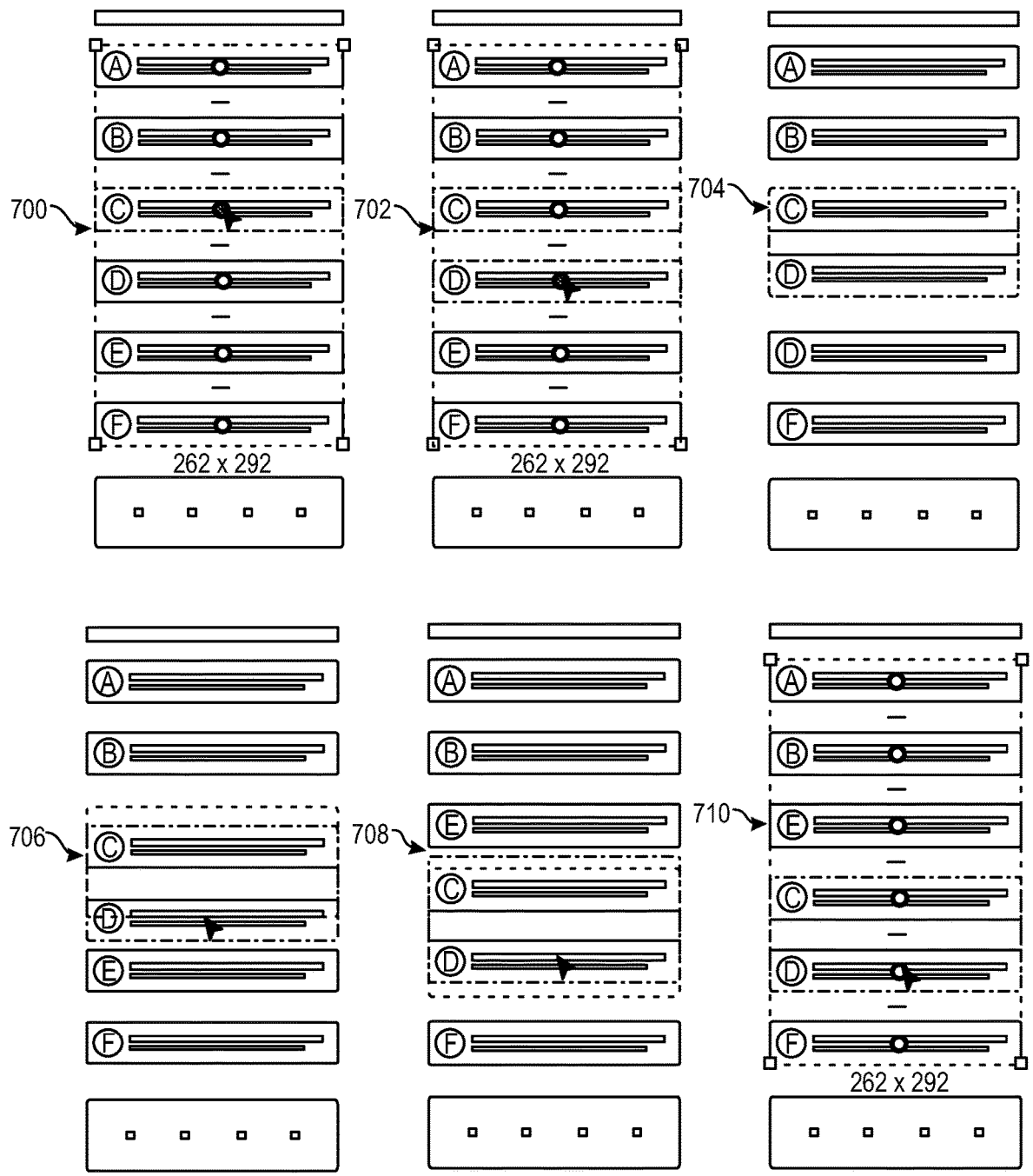
FIG. 7 illustrates an arrangement of objects in a list and operations performed to rearrange multiple objects at once within the list according to an embodiment.

FIG. 7 illustrates an arrangement of objects in a list and operations performed to rearrange multiple objects at once within the list according to an embodiment. The operation to rearrange multiple objects according to FIG. 7 is similar to the operations according to FIG. 6. In arrangement 700, the computing device receives input selecting objects A-F and the computing device treats the objects as an organized collection, in part by providing markers and handles. In arrangement 700, the computing device receives input that marks object C within the organized collection, and in arrangement 702, the computing device receives input that marks object D within the organized collection as well. This operation of selecting multiple objects may be performed by selecting a marker of the object C, holding down a keyboard key (e.g., the SHIFT key), and selecting a marker for the object D.

In arrangement 704, the computing device receives input that moves objects C and D together downward toward object E. The computing device is configured to collapse the selected objects into a single list and to move the single collapsed list around as unit. In this manner, the computing device would ignore intervening objects to move selected objects together. For example, in arrangement 700 blocks C and E could have been selected, in which case the computing device would create a new list of just block C and E to perform further operations thereon, such as moving or resizing the objects.

In arrangement 706, objects C and D are moved down together so that a bounding box around both objects crosses a horizontal, center-axis of block E, at which point object E moves to the original position of object C, as shown in arrangement 708. In response to the operation to rearrange multiple items, the computing device may move other objects in the organized collection using a swap operation or a reflow operation. In arrangement 710 the computing device receives input to place or "drop" the objects C and D at a new position, and the computing device causes display of a final arrangement that maintains uniform spacing between objects and moves object E up while moving objects C and D to the new position.

Figure 8:
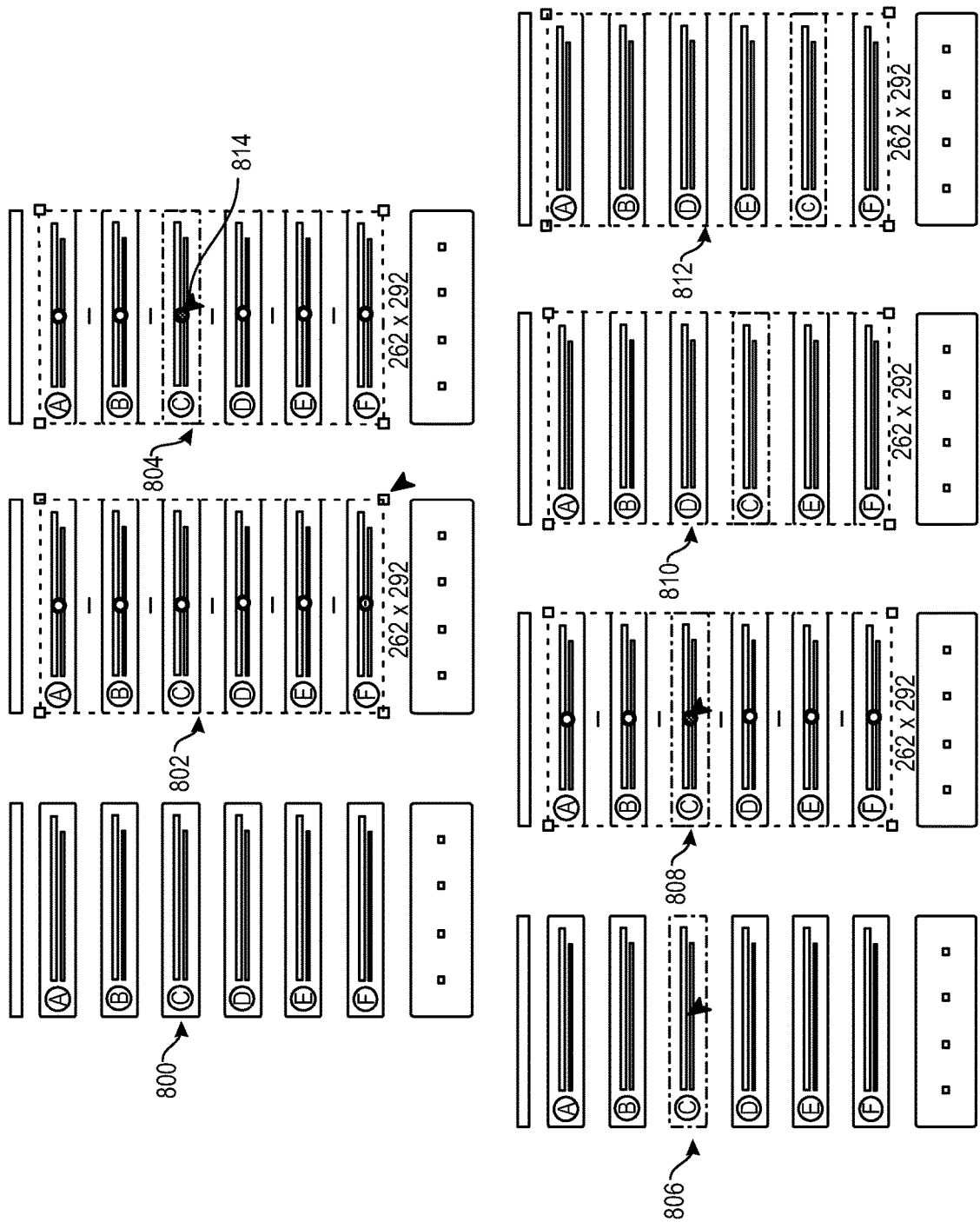
FIG. 8 illustrates an arrangement of objects in a list and operations performed to rearrange objects within the list using keyboard input according to an embodiment.

FIG. 8 illustrates an arrangement of objects in a list and operations performed to rearrange objects within the list using keyboard input according to an embodiment. The operation to rearrange one or more objects according to FIG. 8 is similar to the operations according to FIGS. 6-7 but with a keyboard input, e.g., arrow keys, to move objects. An initial arrangement 800 includes objects A-F in a vertically aligned list. In arrangement 802, the computing device receives input selecting the objects A-F and the computing device treats the objects as an organized collection, in part by providing markers and handles. In arrangement 804, the computing device receives input that a cursor 814 over a marker of object C. In arrangements 806 and 808, the computing device receives input to mark object C, which may be a mouse click on the marker of object C. In arrangement 810, the computing device receives keyboard input, e.g., pressing the ALT key and a down arrow, to move the block C down, while shuffling block D above block C. And, in arrangement 810, the computing device receives another keyboard input, e.g., pressing ALT and down again, to move the block C down again, while shuffling block E above block C.

Other operations discussed herein may also be controlled with keyboard input. In one example, the design tool provides functionality to modify various properties and perform other operations via keyboard input. For instance, a designer may click on an object and use keyboard input into a properties panel to adjust a size and/or location of one or more selected objects. The design may also modify other parameters, such as requiring objects in a list to be center-justified, right-justified, or left-justified. Other keyboard inputs or short-cuts may be used to duplicate objects, delete objects, among others.

Resizing Operations on an Arrangement of Objects

Figure 9:
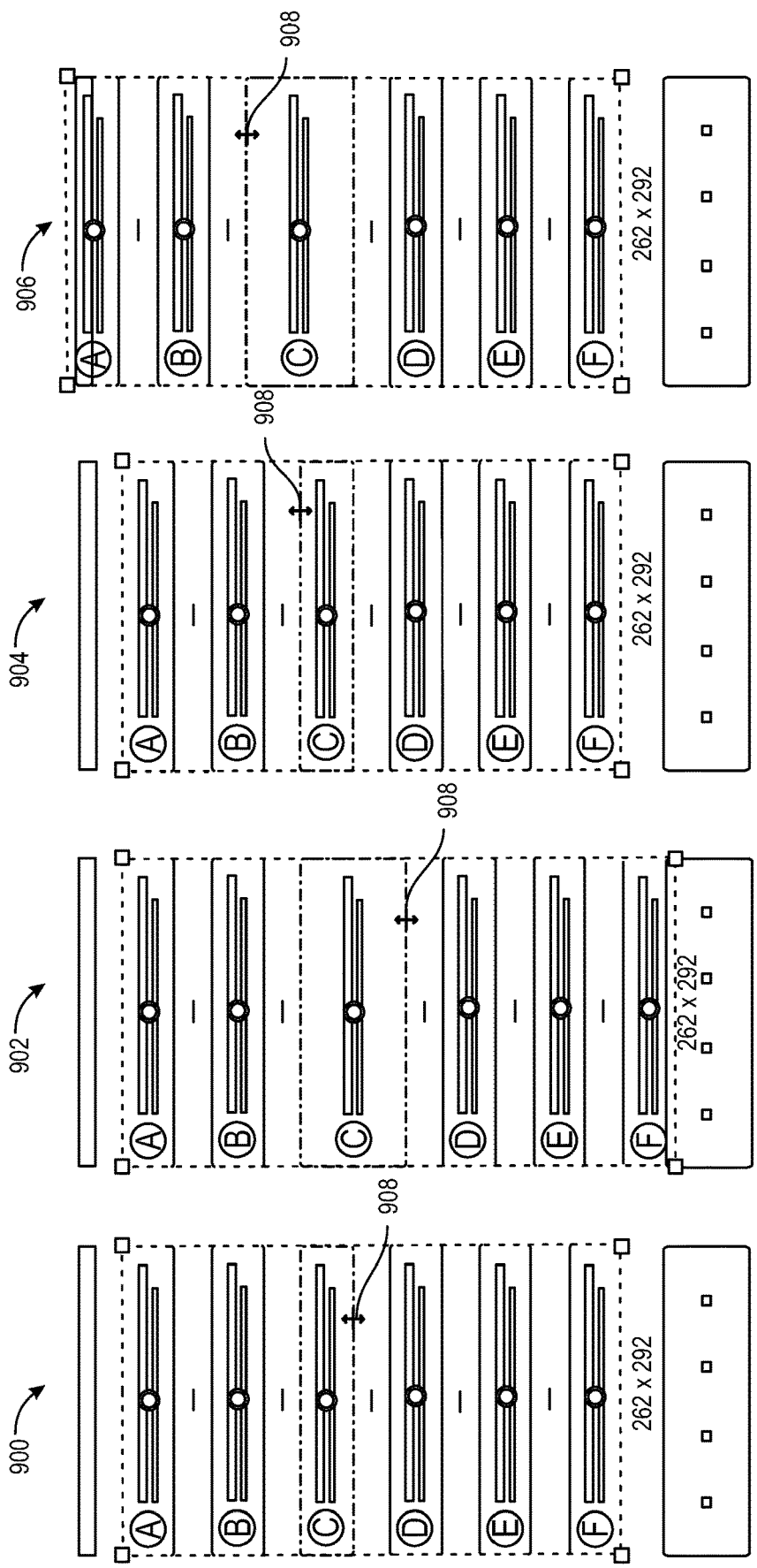
FIG. 9 illustrates an arrangement of objects in a list and operations performed to resize an object within the list according to an embodiment.

FIG. 9 illustrates an arrangement of objects in a list and operations performed to resize an object within the list according to an embodiment. In arrangement 900, objects A-F have been selected and are being treated as an organized collection. In arrangement 900, the computing device receives input highlighting object C, and more particularly activating a pointer or cursor 908 over a bottom edge of the object C. In arrangement 902, the computing device receives input dragging the bottom edge of the object C down to increase the size of the object in the down direction. Resizing object C causes neighboring objects to be rearranged and/or moved to maintain uniform spacing within the organized collection.

Similarly, in arrangement 904, objects A-F have been selected and are being treated as an organized collection. In arrangement 904, the computing device receives input highlighting object C, and more particularly activating a pointer or cursor 908 over a top edge of the object C. In arrangement 906, the computing device receives input dragging the top edge of the object C up to increase the size of the object in the up direction, which causes neighboring objects to be rearranged and/or moved to maintain uniform spacing within the organized collection.

In other examples, the computing device may receive similar input to decrease the size of an object by activating a pointer of an edge or corner of an object and dragging the edge or corner to decrease the size of the object.

Figure 10:
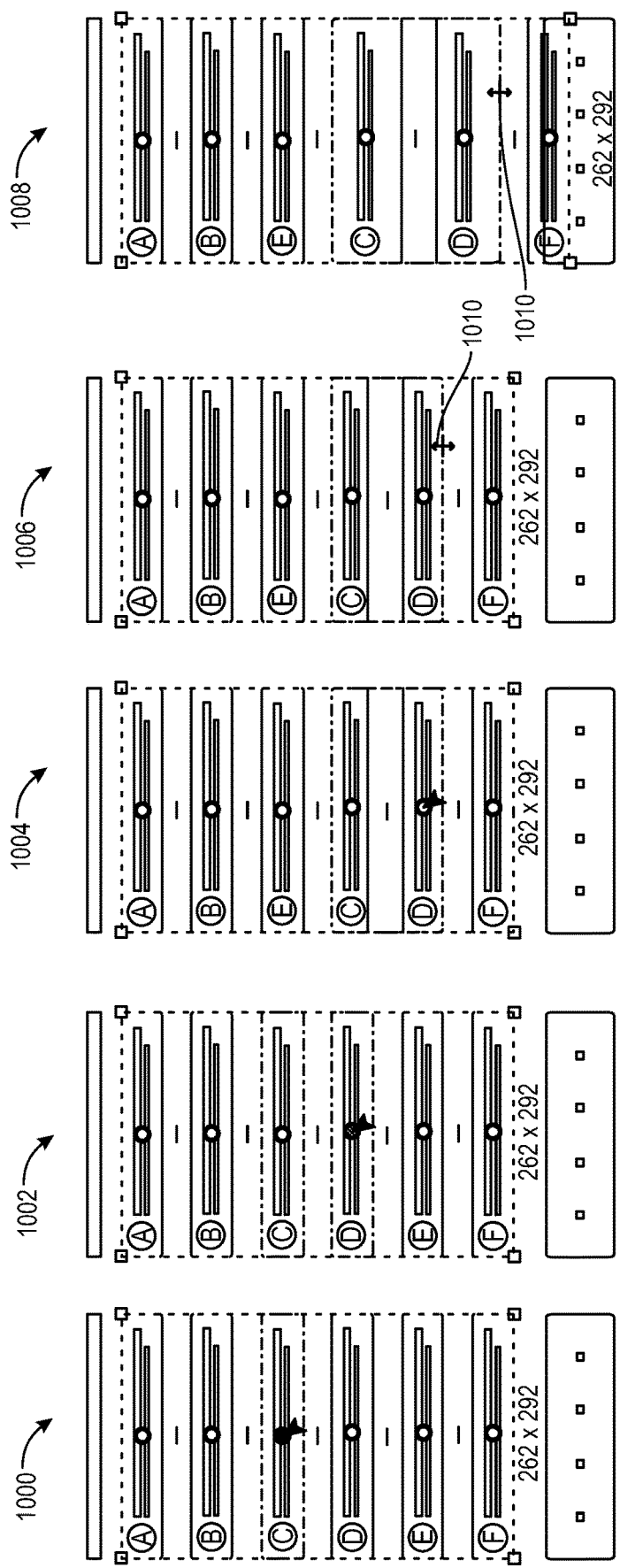
FIG. 10 illustrates an arrangement of objects in a list and operations performed to resize multiple objects at once within the list according to an embodiment.

FIG. 10 illustrates an arrangement of objects in a list and operations performed to resize multiple objects at once within the list according to an embodiment. In arrangement 1000, objects A-F have been selected and are being treated as an organized collection. Further, in arrangement 1000, the computing device receives input that marks object C within the organized collection, and in arrangement 1002, the computing device receives input that marks object D within the organized collection as well. This operation of selecting multiple objects may be performed by selecting a marker of the object C, holding down a keyboard key (e.g., the SHIFT key), and selecting a marker for the object D. Arrangement 1004 illustrates an example of objects C and D being activated together. In arrangement 1006, the computing device receives input activating a pointer or cursor 1010 over a bottom edge of a bounding box around objects C and D. In arrangement 1008, the computing device receives input dragging the bottom edge of the bounding box down to increase the size of objects C and D in the down direction. Resizing objects C and D together causes neighboring objects to be rearranged and/or moved to maintain uniform spacing within the organized collection.

Duplicating and Deleting Objects in an Arrangement

Figure 11:
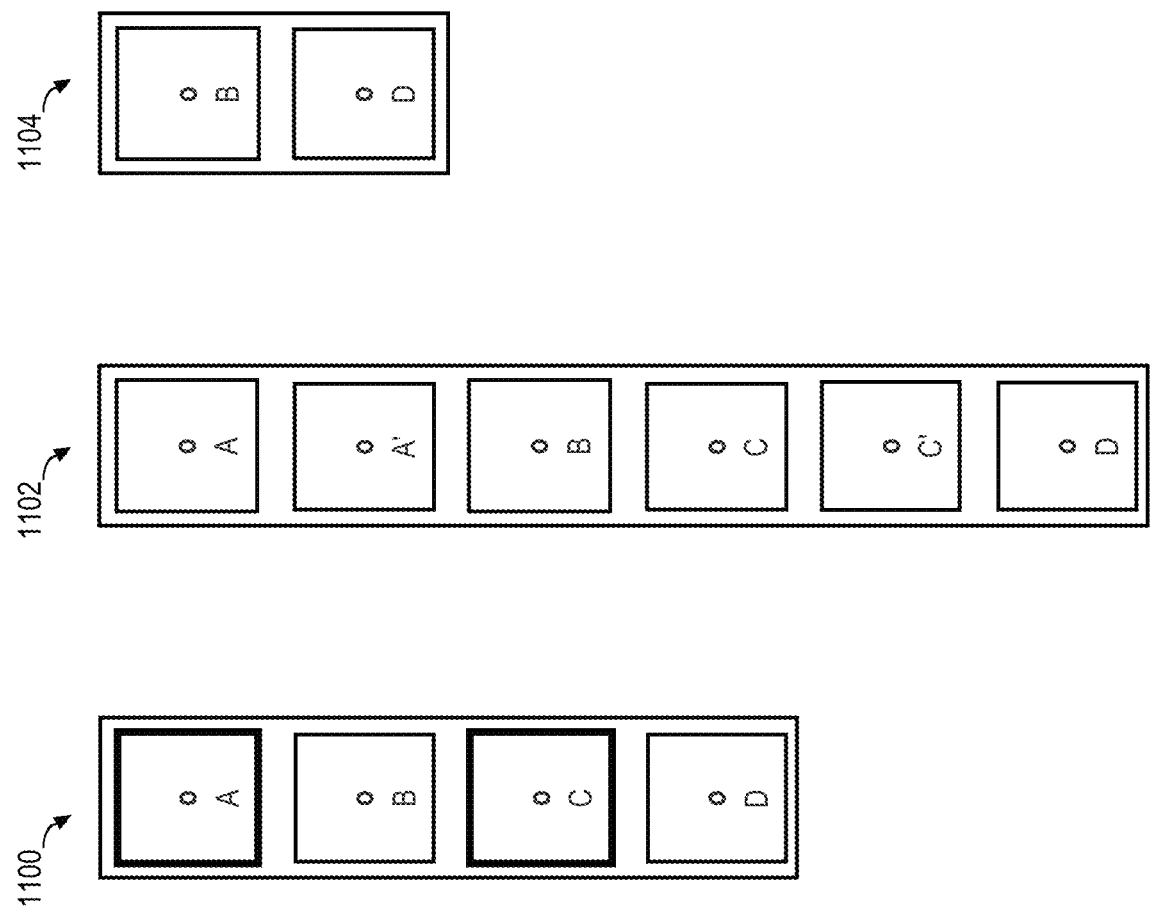
FIG. 11 illustrates an arrangement of objects in a list and operations performed to duplicate and delete objects according to an embodiment.

FIG. 11 illustrates an arrangement of objects in a list and operations performed to duplicate and delete objects according to an embodiment. In arrangement 1100, objects A-D have been selected and are being treated as an organized collection. In arrangement 1100, the computing device receives input marking objects A and C within the organized collection. In arrangement 1102, the computing device receives input to duplicate objects A and C and insert the duplicated objects into the organized collection. In an embodiment, the input to duplicate and insert objects may include a keyboard shortcut, e.g., CTRL-D, or another control may be displayed by the design tool to receive input to perform a duplicate and insert operation.

Arrangement 1102 shows a resulting arrangement of duplicating and inserting objects A and C. According to this embodiment, the computing device performs the operation by creating copies of the marked objects (e.g., objects A' and C'), and inserting each copied object directly after a respective original node in the same list. In this case, the computing device arranges the objects starting from the same initial coordinates of the first object (object A in this example), adds a duplicate object A' after object A and adds a duplicate object C' after object C. The computing device further moves objects B, C, C', and D down to maintain the original uniform spacing between object in the organized collection. The computing device may also provide controls to modify this behavior, for example, a user may select different options (e.g., using keyboard keys or a control panel in a design tool GUI) to insert the duplicate objects A' and C' as a group directly after block A or directly after object C.

The computing device ignores intervening object B and creates objects A' and C' in an arrangement that is inserted after object C to maintain the original uniform spacing between objects in the organized collection.

In arrangement 1104, the computing device receives input to delete objects A and C. For instance, a designer may use a keyboard shortcut or another control provided by the design tool to provide input to the computing device. In response to receiving the input to delete the objects, the computing device automatically rearranges the remaining object B and D to maintain the original uniform spacing between objects in the organized collection. In an embodiment, the computing device stores metadata for each object in the organized collection, and in response to the delete input, removes the deleted objects and then arranges the remaining objects from a top left starting coordinate of the original organized collection and with the same spacing between objects and lists as in the original collection.

Operation to Create Organized Collection

Figure 12:
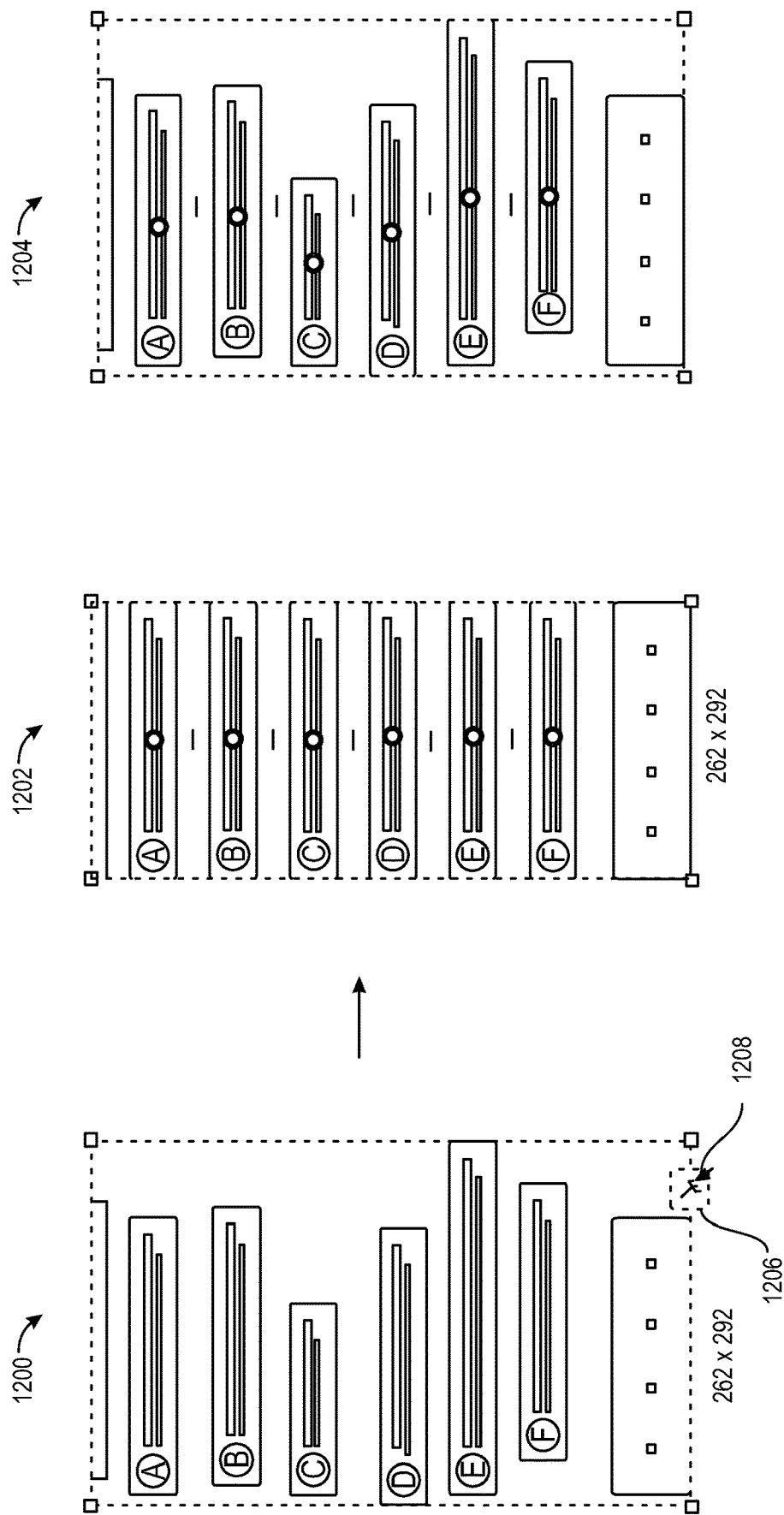
FIG. 12 illustrates an operation to create an organized collection from an arrangement of objects according to an embodiment.

FIG. 12 illustrates an operation to create an organized collection from an arrangement of objects according to an embodiment. In arrangement 1200, a selection of objects A-F does not satisfy criteria for being treated as an organized collection, because the spacing between objects is not uniform along a vertical list axis. In an embodiment, the design tool includes an operation to create an organized collection by automatically rearranging an arrangement of objects that does not presently satisfy certain criteria to be treated as an organized collection. In response determining that the arrangement 1200 of selected objects A-F does not satisfy the criteria, the computing device provides a control 1206 and receives via the control a command to rearrange, without further user-input, the selected arrangement of objects in order to satisfy the criteria to be treated as an organized collection. The command can be via a click or other selection using a displayed cursor 1208, for instance. In arrangements 1202 and 1204, the computing device then controls the display device to display the rearrangement of the selected objects, and allows further operations to be performed within the organized collection. In arrangement 1202, the computing device has rearranged objects A-F so that the spacing between objects is uniform and so that the objects have the same width and are center-aligned. In arrangement 1204, the computing device has rearranged objects A-F so that the vertical spacing between objects is uniform but has not adjusted the size or alignment of objects in the horizontal direction, because the objects in the original arrangement 1200 already met the criteria of overlapping along the vertical axis.

Hardware Overview

Figure 13:
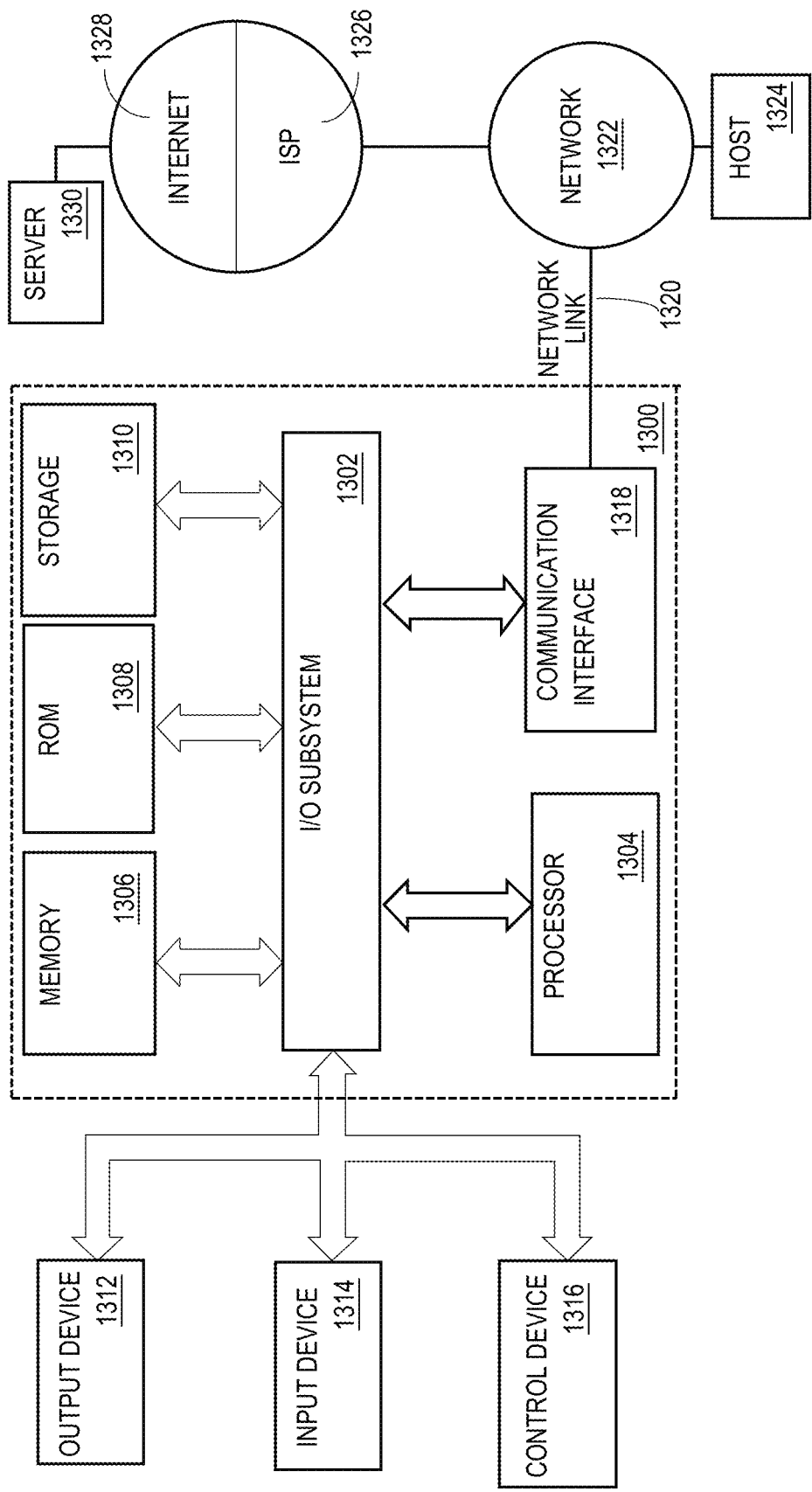
FIG. 13 is a block diagram of a computing device in which the present disclosure may be embodied.

Referring now to FIG. 13, it is a block diagram that illustrates a basic computing device 1300 in which the example embodiment(s) of the present disclosure may be embodied. Computing device 1300 and its components, including their connections, relationships, and functions, is meant to be illustrative, and not meant to limit implementations of the example embodiment(s). Other computing devices suitable for implementing the example embodiment(s) may have different components, including components with different connections, relationships, and functions.

Computing device 1300 may include a bus 1302 or other communication mechanism for addressing main memory 1306 and for transferring data between and among the various components of device 1300.

Computing device 1300 may also include one or more hardware processors 1304 coupled with bus 1302 for processing information. A hardware processor 1304 may be a general purpose microprocessor, a system on a chip (SoC), or other processor.

Main memory 1306, such as a random access memory (RAM) or other dynamic storage device, also may be coupled to bus 1302 for storing information and software instructions to be executed by processor(s) 1304. Main memory 1306 also may be used for storing temporary variables or other intermediate information during execution of software instructions to be executed by processor(s) 1304.

Software instructions, when stored in storage media accessible to processor(s) 1304, render computing device 1300 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1300 also may include read only memory (ROM) 1308 or other static storage device coupled to bus 1302 for storing static information and software instructions for processor(s) 1304.

One or more mass storage devices 1310 may be coupled to bus 1302 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1310 (e.g., the main hard disk for the device) stores a body of program and data for directing operation of the computing device, including an operating system, user application programs, driver and other support files, as well as other data files of all sorts.

Computing device 1300 may be coupled via bus 1302 to display 1312, such as a liquid crystal display (LCD) or other electronic visual display, for displaying information to a computer user. In some configurations, a touch sensitive surface incorporating touch detection technology (e.g., resistive, capacitive, etc.) may be overlaid on display 1312 to form a touch sensitive display for communicating touch gesture (e.g., finger or stylus) input to processor(s) 1304.

An input device 1314, including alphanumeric and other keys, may be coupled to bus 1302 for communicating information and command selections to processor 1304. In addition to or instead of alphanumeric and other keys, input device 1314 may include one or more physical buttons or switches such as, for example, a power (on/off) button, a "home" button, volume control buttons, or the like.

Another type of user input device may be a cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

While in some configurations, such as the configuration depicted in FIG. 13, one or more of display 1312, input device 1314, and cursor control 1316 are external components (i.e., peripheral devices) of computing device 1300, some or all of display 1312, input device 1314, and cursor control 1316 are integrated as part of the form factor of computing device 1300 in other configurations.

Functions of the disclosed systems, methods, and modules may be performed by computing device 1300 in response to processor(s) 1304 executing one or more programs of software instructions contained in main memory 1306. Such software instructions may be read into main memory 1306 from another storage medium, such as storage device(s) 1310. Execution of the software instructions contained in main memory 1306 cause processor(s) 1304 to perform the functions of the example embodiment(s).

While functions and operations of the example embodiment(s) may be implemented entirely with software instructions, hard-wired or programmable circuitry of computing device 1300 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more software instructions to processor(s) 1304 for execution. For example, the software instructions may initially be carried on a magnetic disk or solid-state drive of a remote computer. The remote computer can load the software instructions into its dynamic memory and send the software instructions over a telephone line using a modem. A modem local to computing device 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor(s) 1304 retrieves and executes the software instructions. The software instructions received by main memory 1306 may optionally be stored on storage device(s) 1310 either before or after execution by processor(s) 1304.

Computing device 1300 also may include one or more communication interface(s) 1318 coupled to bus 1302. A communication interface 1318 provides a two-way data communication coupling to a wired or wireless network link 1320 that is connected to a local network 1322 (e.g., Ethernet network, Wireless Local Area Network, cellular phone network, Bluetooth wireless network, or the like). Communication interface 1318 sends and receives electrical, electromagnetic, or optical signals that carry digital data streams representing various types of information. For example, communication interface 1318 may be a wired network interface card, a wireless network interface card with an integrated radio antenna, or a modem (e.g., ISDN, DSL, or cable modem).

Network link(s) 1320 typically provide data communication through one or more networks to other data devices. For example, a network link 1320 may provide a connection through a local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network(s) 1322 and Internet 1328 use electrical, electromagnetic or optical signals that carry digital data streams. The signals through the various networks and the signals on network link(s) 1320 and through communication interface(s) 1318, which carry the digital data to and from computing device 1300, are example forms of transmission media.

Computing device 1300 can send messages and receive data, including program code, through the network(s), network link(s) 1320 and communication interface(s) 1318. In the Internet example, a server 1330 might transmit a requested code for an application program through Internet 1328, ISP 1326, local network(s) 1322 and communication interface(s) 1318.

The received code may be executed by processor 1304 as it is received, and/or stored in storage device 1310, or other non-volatile storage for later execution.

Software Overview

Figure 14:
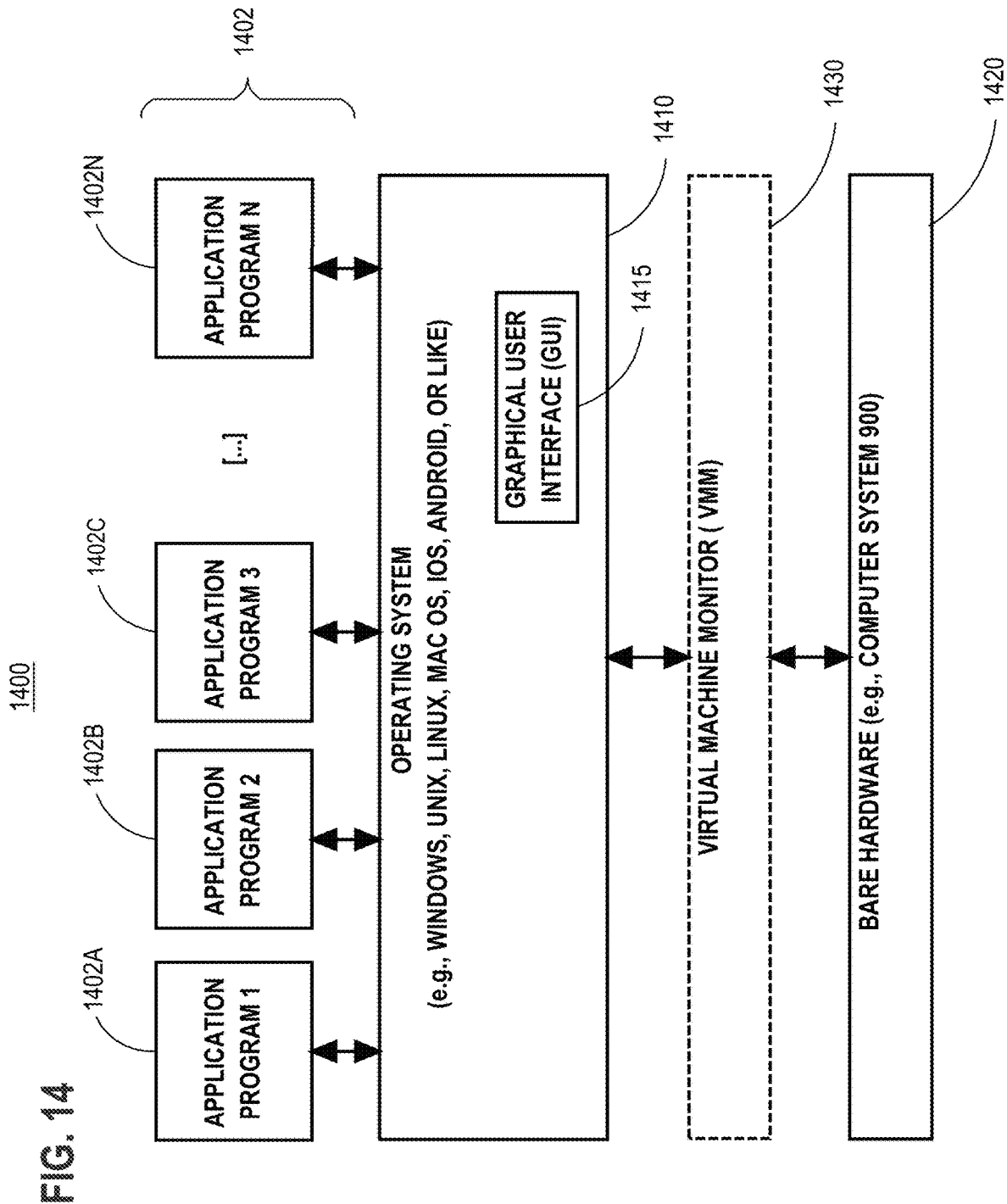
FIG. 14 is a block diagram of a basic software system for controlling the operation of the computing device.

FIG. 14 is a block diagram of a basic software system 1400 that may be employed for controlling the operation of computing device 1300. Software system 1400 and its components, including their connections, relationships, and functions, is meant to be illustrative, and not meant to limit implementations of the example embodiment(s). Other software systems suitable for implementing the example embodiment(s) may have different components, including components with different connections, relationships, and functions.

Software system 1400 is provided for directing the operation of computing device 1300. Software system 1400, which may be stored in system memory (RAM) 1306 and on fixed storage (e.g., hard disk or flash memory) 1310, includes a kernel or operating system (OS) 1410.

The OS 1410 manages low-level aspects of computer operation, including managing execution of processes, memory allocation, file input and output (I/O), and device I/O. One or more application programs, represented as 1402A, 1402B, 1402C . . . 1402N, may be "loaded" (e.g., transferred from fixed storage 1310 into memory 1306) for execution by the system 1400. The applications or other software intended for use on device 1300 may also be stored as a set of downloadable computer-executable instructions, for example, for downloading and installation from an Internet location (e.g., a Web server, an app store, or other online service).

Software system 1400 includes a graphical user interface (GUI) 1415, for receiving user commands and data in a graphical (e.g., "point-and-click" or "touch gesture") fashion. These inputs, in turn, may be acted upon by the system 1400 in accordance with instructions from operating system 1410 and/or application(s) 1402. The GUI 1415 also serves to display the results of operation from the OS 1410 and application(s) 1402, whereupon the user may supply additional inputs or terminate the session (e.g., log off).

OS 1410 can execute directly on the bare hardware 1420 (e.g., processor(s) 1304) of device 1300. Alternatively, a hypervisor or virtual machine monitor (VMM) 1430 may be interposed between the bare hardware 1420 and the OS 1410. In this configuration, VMM 1430 acts as a software "cushion" or virtualization layer between the OS 1410 and the bare hardware 1420 of the device 1300.

VMM 1430 instantiates and runs one or more virtual machine instances ("guest machines"). Each guest machine comprises a "guest" operating system, such as OS 1410, and one or more applications, such as application(s) 1402, designed to execute on the guest operating system. The VMM 1430 presents the guest operating systems with a virtual operating platform and manages the execution of the guest operating systems.

In some instances, the VMM 1430 may allow a guest operating system to run as if it is running on the bare hardware 1420 of device 1300 directly. In these instances, the same version of the guest operating system configured to execute on the bare hardware 1420 directly may also execute on VMM 1430 without modification or reconfiguration. In other words, VMM 1430 may provide full hardware and CPU virtualization to a guest operating system in some instances.

In other instances, a guest operating system may be specially designed or configured to execute on VMM 1430 for efficiency. In these instances, the guest operating system is "aware" that it executes on a virtual machine monitor. In other words, VMM 1430 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method comprising:
causing a display device to display a plurality of objects in a design layout;
receiving one or more first inputs that select at least a subset of objects from the plurality of objects in the design layout;
wherein within the design layout, the subset of objects is arranged in a first arrangement;
in response to receiving the one or more first inputs that select the subset of objects from the plurality of objects, determining that the first arrangement of the subset of objects satisfies criteria for treating the subset of objects as an organized collection;
wherein each object of the subset of objects is included in one or more lists;
wherein the criteria include:
within each list of the one or more lists, overlap along a first axis of each object in each said list, and uniform spacing along the first axis between each object in each said list; and
when the one or more lists include a plurality of lists, uniform spacing along a second axis between lists of the plurality of lists;
after determining that the first arrangement of the subset of objects satisfies the criteria, receiving one or more second inputs corresponding to a criteria-violating arrangement operation, wherein the criteria-violating arrangement operation is criteria violating based on a resulting arrangement of the subset of objects that violate the criteria for treating the subset of objects as an organized collection;
in response to the one or more second inputs, performing the criteria-violating arrangement operation on the organized collection to generate an intermediate arrangement for the subset of objects;
determining that the intermediate arrangement for the subset of objects violates the criteria for treating the subset of objects as an organized collection;
in response to determining (a) that the first arrangement of the subset of objects satisfies the criteria and (b) that the intermediate arrangement for the subset of objects violates the criteria for treating the subset of objects as an organized collection, automatically rearranging the subset of objects into a second arrangement that satisfies the criteria for treating the subset of objects as an organized collection;
causing the display device to display the second arrangement of the subset of objects.

2. The method of claim 1, wherein the criteria further include:
the overlap along the first axis of each object in each said list including overlap along the first axis between a bounding box around each object in each said list; and
the uniform spacing along the first axis between each object in each said list including uniform spacing along the first axis between bounding boxes of adjacent objects in each said list.

3. The method of claim 1, wherein a list including a single object satisfies the criteria of the overlap along the first axis of each object in each said list, and the uniform spacing along the first axis between each object in each said list.

4. The method of claim 1, wherein the criteria further include each object of the subset of objects being included in a single list of the one or more lists.

5. The method of claim 1, wherein the criteria further include, when the one or more lists include the plurality of lists, within each list:
overlap along the first axis of each object in each said list includes a center of each object in each said list being aligned along the first axis; and uniform spacing along the first axis between each object in each said list includes uniform spacing along the first axis between a bounding box of adjacent objects in each said list.

6. The method of claim 5, wherein the criteria further include, when the one or more lists include the plurality of lists, the uniform spacing along the second axis between lists of the plurality of lists includes uniform spacing along the second axis between respective bounding boxes around adjacent lists of the plurality of lists.

7. The method of claim 1, further comprising:
causing the display device to display a third arrangement of the subset of objects;
in response to determining that the third arrangement of the subset of objects violates the criteria for treating the subset of objects as an organized collection, receiving input to generate a fourth arrangement of the subset of objects;
in response to receiving the input to generate the fourth arrangement, generating the fourth arrangement of the subset of objects that satisfies the criteria; and
causing the display device to display the fourth arrangement of the subset of objects.

8. The method of claim 7, further comprising:
after determining that the fourth arrangement of the subset of objects satisfies the criteria, receiving one or more third inputs corresponding to a subsequent criteria-violating arrangement operation, wherein the subsequent criteria-violating arrangement operation is criteria violating based on a resulting subsequent arrangement of the subset of objects that violate the criteria for treating the subset of objects as an organized collection;
in response to the one or more third inputs, performing the subsequent criteria-violating arrangement operation on the organized collection to generate a subsequent intermediate arrangement for the subset of objects;
determining that the subsequent intermediate arrangement for the subset of objects violates the criteria for treating the subset of objects as an organized collection;
in response to determining that the subsequent intermediate arrangement for the subset of objects violates the criteria for treating the subset of objects as an organized collection, automatically rearranging the subset of objects into a fifth arrangement that satisfies the criteria for treating the subset of objects as an organized collection.

9. The method of claim 1, further comprising, in response to determining that the first arrangement of the subset of objects satisfies the criteria:
causing the display device to display a first control and a second control, wherein the first control is configured to receive input to select one or more objects for interaction within the organized collection, and wherein the second control is configured to receive input to adjust at least one of spacing between objects within the organized collection or to adjust spacing between lists within the organized collection;
allowing arrangement operations on the one or more objects selected via the first control and on spacing adjustments received via the second control;
wherein the arrangement operation is an operation on the one or more objects selected via the first control or on spacing adjustments received via the second control;
wherein rearranging the subsets of the objects into the second arrangement comprises automatically adjusting spacing to maintain, within each list, uniform spacing along the first axis between each object in each said list, and to maintain, when the one or more lists include the plurality of lists, uniform spacing along the second axis between lists of the plurality of lists.

10. The method of claim 1, wherein performing the criteria-violating arrangement operation on the organized collection includes:
marking multiple objects of the subset of objects; and
one or more of moving the marked multiple objects as a group, or adjusting one or more dimensions of the marked multiple objects as a group.

11. One or more non-transitory computer-readable storage medium storing instructions that, when executed by one or causing one or more processors, cause the one or more processors to perform functions comprising:
causing a display device to display a plurality of objects in a design layout;
receiving one or more first inputs that select at least a subset of objects from the plurality of objects in the design layout;
wherein within the design layout, the subset of objects is arranged in a first arrangement;
in response to receiving the one or more first inputs that select the subset of objects from the plurality of objects, determining that the first arrangement of the subset of objects satisfies criteria for treating the subset of objects as an organized collection;
wherein each object of the subset of objects is included in one or more lists;
wherein the criteria include:
within each list of the one or more lists, overlap along a first axis of each object in each said list, and uniform spacing along the first axis between each object in each said list; and
when the one or more lists include a plurality of lists, uniform spacing along a second axis between lists of the plurality of lists;
after determining that the first arrangement of the subset of objects satisfies the criteria, receiving one or more second inputs corresponding to a criteria-violating arrangement operation, wherein the criteria-violating arrangement operation is criteria violating based on a resulting arrangement of the subset of objects that violate the criteria for treating the subset of objects as an organized collection;
in response to the one or more second inputs, performing the criteria-violating arrangement operation on the organized collection to generate an intermediate arrangement for the subset of objects;
determining that the intermediate arrangement for the subset of objects violates the criteria for treating the subset of objects as an organized collection;
in response to determining (a) that the first arrangement of the subset of objects satisfies the criteria and (b) that the intermediate arrangement for the subset of objects violates the criteria for treating the subset of objects as an organized collection, automatically rearranging the subset of objects into a second arrangement that satisfies the criteria for treating the subset of objects as an organized collection;
causing the display device to display the second arrangement of the subset of objects.

12. The one or more non-transitory computer-readable storage medium of claim 11, wherein the criteria further include:

the overlap along the first axis of each object in each said list including overlap along the first axis between a bounding box around each object in each said list; and the uniform spacing along the first axis between each object in each said list including uniform spacing along the first axis between bounding boxes of adjacent objects in each said list.

13. The one or more non-transitory computer-readable storage medium of claim 11, wherein a list including a single object satisfies the criteria of the overlap along the first axis of each object in each said list, and the uniform spacing along the first axis between each object in each said list.

14. The one or more non-transitory computer-readable storage medium of claim 11, wherein the criteria further include each object of the subset of objects being included in a single list of the one or more lists.

15. The one or more non-transitory computer-readable storage medium of claim 11, wherein the criteria further include, when the one or more lists include the plurality of lists, within each list:
  overlap along the first axis of each object in each said list includes a center of each object in each said list being aligned along the first axis; and
  uniform spacing along the first axis between each object in each said list includes uniform spacing along the first axis between a bounding box of adjacent objects in each said list.

16. The one or more non-transitory computer-readable storage medium of claim 15, wherein the criteria further include, when the one or more lists include the plurality of lists, the uniform spacing along the second axis between lists of the plurality of lists includes uniform spacing along the second axis between respective bounding boxes around adjacent lists of the plurality of lists.

17. The one or more non-transitory computer-readable storage medium of claim 11, further storing instructions, that when executed by one or more processors cause the one or more processors to perform functions comprising:
  causing the display device to display a third arrangement of the subset of objects;
  in response to determining that the third arrangement of the subset of objects violates the criteria for treating the subset of objects as an organized collection, receiving input to generate a fourth arrangement of the subset of objects;
  in response to receiving the input to generate the fourth arrangement, generating the fourth arrangement of the subset of objects that satisfies the criteria; and
  causing the display device to display the fourth arrangement of the subset of objects.

18. The one or more non-transitory computer-readable storage medium of claim 17, further storing instructions, that when executed by one or more processors cause the one or more processors to perform functions comprising:
  after determining that the fourth arrangement of the subset of objects satisfies the criteria, receiving one or more third inputs corresponding to a subsequent criteria-violating arrangement operation, wherein the subsequent criteria-violating arrangement operation is criteria violating based on a resulting subsequent arrangement of the subset of objects that violate the criteria for treating the subset of objects as an organized collection;
  in response to the one or more third inputs, performing the subsequent criteria-violating arrangement operation on the organized collection to generate a subsequent intermediate arrangement for the subset of objects;
  determining that the subsequent intermediate arrangement for the subset of objects violates the criteria for treating the subset of objects as an organized collection;
  in response to determining that the subsequent intermediate arrangement for the subset of objects violates the criteria for treating the subset of objects as an organized collection, automatically rearranging the subset of objects into a fifth arrangement that satisfies the criteria for treating the subset of objects as an organized collection.

19. The one or more non-transitory computer-readable storage medium of claim 11, further storing instructions, that when executed by one or more processors cause the one or more processors to perform functions comprising:
  in response to determining that the first arrangement of the subset of objects satisfies the criteria:
    causing the display device to display a first control and a second control, wherein the first control is configured to receive input to select one or more objects for interaction within the organized collection, and wherein the second control is configured to receive input to adjust at least one of spacing between objects within the organized collection or to adjust spacing between lists within the organized collection;
    allowing arrangement operations on the one or more objects selected via the first control and on spacing adjustments received via the second control;
  wherein the arrangement operation is an operation on the one or more objects selected via the first control or on spacing adjustments received via the second control;
  wherein rearranging the subsets of the objects into the second arrangement comprises automatically adjusting spacing to maintain, within each list, uniform spacing along the first axis between each object in each said list, and to maintain, when the one or more lists include the plurality of lists, uniform spacing along the second axis between lists of the plurality of lists.

20. The one or more non-transitory computer-readable storage medium of claim 11, wherein performing the criteria-violating arrangement operation on the organized collection includes:
  marking multiple objects of the subset of objects; and
  one or more of moving the marked multiple objects as a group, or adjusting one or more dimensions of the marked multiple objects as a group.

* * * * *